United States Patent
Deutsch et al.

(10) Patent No.: US 7,046,410 B2
(45) Date of Patent: May 16, 2006

(54) ACTUATABLE DIFFRACTIVE OPTICAL PROCESSOR

(75) Inventors: Erik R. Deutsch, Cambridge, MA (US); Malcolm C. Smith, Charlton, MA (US); Michael A. Butler, Andover, MA (US); Stephen D. Senturia, Brookline, MA (US)

(73) Assignee: Polychromix, Inc., Wilmington, MA (US)

( * ) Notice: Subject to any disclaimer, the term of this patent is extended or adjusted under 35 U.S.C. 154(b) by 564 days.

(21) Appl. No.: 09/975,169

(22) Filed: Oct. 11, 2001

(65) Prior Publication Data

US 2003/0072068 A1 Apr. 17, 2003

(51) Int. Cl.
G02B 26/08 (2006.01)

(52) U.S. Cl. .............................. 359/224; 359/291
(58) Field of Classification Search ................ 359/233, 359/291, 224, 295, 298, 846, 850, 791, 223, 359/227

See application file for complete search history.

(56) References Cited

U.S. PATENT DOCUMENTS

| 3,553,364 | A | 1/1971 | Lee |
| 4,234,788 | A | 11/1980 | Palmer et al. |
| 4,252,697 | A | 2/1981 | Hashizume et al. |
| 4,731,670 | A | 3/1988 | Allen et al. |
| 4,805,038 | A | 2/1989 | Seligson |
| 5,022,745 | A | 6/1991 | Zayhowski et al. |
| 5,115,344 | A | 5/1992 | Jaskie |

(Continued)

FOREIGN PATENT DOCUMENTS

| EP | 1 014 143 A1 | 6/2000 |
| EP | 1 122 577 A2 | 8/2001 |
| EP | 1 143 287 A2 | 10/2001 |
| WO | WO 91/02991 A1 | 3/1991 |
| WO | WO 98/41893 A1 | 9/1998 |
| WO | WO 01/11394 A1 | 2/2001 |
| WO | WO 01/11396 A1 | 2/2001 |
| WO | WO 01/11410 A1 | 2/2001 |
| WO | WO 01/11419 A2 | 2/2001 |
| WO | WO 01/42825 A1 | 6/2001 |

OTHER PUBLICATIONS

*Analysis of Grating Light Valves with Partial Surface Electrodes*, Furlani et al., J. Appl. Phys. 83 (2), Jan. 15, 1998, American Institute of Physics, pp 629–634.

*Positioning, Control, and Dynamics of Electrostatic Actuators for use in Optical and RF Systems*, E.S. Hung, Aug. 21, 1998 thesis Massachusetts Institute of Technology, 107 pages.

*Miniature Fabry–Perot Interferometers Micromachined in Silicon for use in Optical Fiber WDM Systems*, J.H. Jerman et al., IEEE 1991 372, International Conf. On Solid–State Sensors and Actuators 1991, pp 372–375.

*Micromechanical Light Modulator Array Fabricated on Silicon*, K.E. Petersen, IBM Research Lab., Applied Physics Letters, vol. 31, No. 8, Oct. 15, 1977, pp 521–523.

(Continued)

*Primary Examiner*—Euncha P. Cherry
(74) *Attorney, Agent, or Firm*—Lowrie, Lando & Anastasi, LLP

(57) ABSTRACT

A programmable MEMS diffractive optical processor having actuatable grating elements that are optically adjacent and supported at points intermediate the ends of the grating elements. The grating elements are maintained substantially flat during actuation of the grating elements.

30 Claims, 12 Drawing Sheets

U.S. PATENT DOCUMENTS

| | | |
|---|---|---|
| 5,164,688 A | 11/1992 | Larson |
| 5,168,249 A | 12/1992 | Larson |
| 5,175,521 A | 12/1992 | Larson |
| 5,202,785 A | 4/1993 | Nelson |
| 5,206,557 A | 4/1993 | Bobbio |
| 5,212,582 A | 5/1993 | Nelson |
| 5,233,456 A | 8/1993 | Nelson |
| 5,291,502 A | 3/1994 | Pezeshki et al. |
| 5,311,360 A | 5/1994 | Bloom et al. |
| 5,353,641 A | 10/1994 | Tang |
| 5,392,151 A | 2/1995 | Nelson |
| 5,396,066 A | 3/1995 | Ikeda et al. |
| 5,459,610 A | 10/1995 | Bloom et al. |
| 5,561,523 A | 10/1996 | Blomberg et al. |
| 5,629,951 A | 5/1997 | Chang-Hasnain et al. |
| 5,640,133 A | 6/1997 | MacDonald et al. |
| 5,646,772 A | 7/1997 | Yurke |
| 5,654,819 A | 8/1997 | Goossen et al. |
| 5,661,592 A | 8/1997 | Bornstein et al. |
| 5,677,783 A | 10/1997 | Bloom et al. |
| 5,696,662 A | 12/1997 | Bauhahn |
| 5,739,945 A | 4/1998 | Tayebati |
| 5,745,271 A | 4/1998 | Ford et al. |
| 5,757,536 A | 5/1998 | Ricco et al. |
| 5,781,670 A | 7/1998 | Deacon et al. |
| 5,794,023 A | 8/1998 | Hobbs et al. |
| 5,808,797 A | 9/1998 | Bloom et al. |
| 5,836,203 A | 11/1998 | Martin et al. |
| 5,841,579 A | 11/1998 | Bloom et al. |
| 5,847,859 A | 12/1998 | Murata |
| 5,867,302 A * | 2/1999 | Fleming ..................... 359/291 |
| 5,870,221 A | 2/1999 | Goossen |
| 5,905,571 A | 5/1999 | Butler et al. |
| 5,905,589 A | 5/1999 | Tanaka et al. |
| 5,920,418 A | 7/1999 | Shiono et al. |
| 5,933,277 A | 8/1999 | Troxell et al. |
| 5,949,568 A | 9/1999 | Koo et al. |
| 5,949,570 A | 9/1999 | Shiono et al. |
| 5,953,161 A | 9/1999 | Troxell et al. |
| 5,966,235 A | 10/1999 | Walker |
| 5,969,848 A | 10/1999 | Lee et al. |
| 5,978,127 A | 11/1999 | Berg |
| 5,991,079 A | 11/1999 | Furlani et al. |
| 5,998,906 A | 12/1999 | Jerman et al. |
| 5,999,319 A | 12/1999 | Castracane |
| 6,004,912 A | 12/1999 | Gudeman |
| 6,014,257 A | 1/2000 | Furlani et al. |
| 6,031,652 A | 2/2000 | Furlani et al. |
| 6,038,057 A | 3/2000 | Brazas, Jr. et al. |
| 6,061,166 A | 5/2000 | Furlani et al. |
| 6,067,183 A | 5/2000 | Furlani et al. |
| 6,072,620 A | 6/2000 | Shiono et al. |
| 6,088,148 A | 7/2000 | Furlani et al. |
| 6,108,117 A | 8/2000 | Furlani et al. |
| 6,130,770 A | 10/2000 | Bloom |
| 6,141,139 A | 10/2000 | Furlani et al. |
| 6,144,481 A | 11/2000 | Kowarz et al. |
| 6,169,624 B1 | 1/2001 | Godil et al. |
| 6,172,796 B1 | 1/2001 | Kowarz et al. |
| 6,175,443 B1 | 1/2001 | Aksyuk et al. |
| 6,181,458 B1 | 1/2001 | Brazas, Jr. et al. |
| 6,188,519 B1 | 2/2001 | Johnson |
| 6,215,579 B1 | 4/2001 | Bloom et al. |
| 6,233,087 B1 | 5/2001 | Hawkins et al. |
| 6,238,581 B1 | 5/2001 | Hawkins et al. |
| 6,243,194 B1 | 6/2001 | Brazas, Jr. et al. |
| 6,251,842 B1 | 6/2001 | Gudeman |
| 6,252,697 B1 | 6/2001 | Hawkins et al. |
| 6,268,952 B1 | 7/2001 | Godil et al. |
| 6,282,012 B1 | 8/2001 | Kowarz et al. |
| 6,282,213 B1 | 8/2001 | Gutin et al. |
| 6,284,560 B1 | 9/2001 | Jech, Jr. et al. |
| 6,288,824 B1 | 9/2001 | Kastalsky |
| 6,329,738 B1 | 12/2001 | Hung et al. |

OTHER PUBLICATIONS

*Leveraged Bending for Full–Gap Positioning with Electrostatic Actuation*, E.S. Hung et al., MIT, Solid–State Sensor and Actuator Workshop Hilton Head Island, SC Jun. 8, 1998–Jun. 11, 1998 pp 83–86.

*MEMS Deformable Mirrors for Adaptive Optics*, Bifano, et al., Dept. of Aerospace and Mech. Eng., BU, Boston, MA, Solid–State Sensor and Actuator Workshop Hilton Head Island, SC Jun. 8, 1998–Jun. 11, 1998 pp 71–74.

*Electrostatic Effects in Micromachined Actuators for Adaptive Optics*, Horenstein, et al., Dept. of Aerospace and Mech. Eng., BU, Boston, MA, J. of Electrostatics, pp 69–81.

*Simulating Electrostrictive Deformable Mirrors: I. Nonlinear Status Analysis*, Hom et al., Lockheed Martin Missiles and Space, Smart Mater. Struct. 8, (1999), Jul. 26, 1999.

*Simulating Electrostrictive Deformable Mirrors: II. Nonlinear Dynamic Analysis*, Hom, Lockheed Martin Missiles and Space, Smart Mater. Struct. 8, (1999), Jul. 26, 1999.

*Development of Microelectromechanical Deformable Mirrors for Phase Modulation of Light*, Mali et al., Dept. of Aerospace and Mech. Eng., BU, Boston, MA, pp 542–548.

*Optical Phase Modulation Using a Refractive Lenslet Array and Microelectromechanical Deformable Mirror*, Cowan et al., AFRL/MLP, Optical Engineering, vol. 37 No. 12, 12/123/98, pp 3237–3247.

*Adaptive Control of Micromachined Continuous–Membrane Deformable Mirror for Aberration Compensation*, Zhu et al., Applied Optics, vol. 38, No. 1, Jan. 1, 1998, pp 168–176.

*Real Time Optical Correction Using Electrostatically Actuated MEMS Devices*, Horenstein, et al., Dept. of Aerospace and Mech. Eng., BU, Boston, MA, J. of Electrostatics, 1999, pp 69–81.

*Surface Micromachined Segmented Mirrors for Adaptive Optics*, Cowan et al., IEEE J. of Selected Topics in Quantum Electronics, vol. 5, No. 1, Jan./Feb. 1999, pp 90–101.

*Microelectromechanical Deformable Mirrors*, Bifano et al., IEEE J. of Selected Topics in Quantum Electronics, vol. 5, No. 1, Jan./Feb. 1999, pp 83–89.

*Design and Fabrication of 10×10 Micro–Spatial Light Modulator Array for Phase and Amplitude Modulation*, Chung et al., Sensors and Actuators 78, Elsevier Science S.A., 1999, pp 63–70.

*A Design–Based Approach to Planarization in Multilayer Surface Micromachining*, Mali et al., Dept. of Aerospace and Mech. Eng., BU, Boston, MA, Micromech. Microeng. 9 (1999) pp 294–299.

*Variable Gratings for Optical Switching: Rigorous Electromagnetic Simulation and Design*, Gani et al., Opt. Eng. 38(3) 552–557, (Mar. 1999) Soc. of Photo–Optical Ins. Eng. pp 552–557.

*Differential Capacitive Position Sensor for Planar MEMS Structgures with Vertical Motion*, , Horenstein, et al., Dept. of Aerospace and Mech. Eng., BU, Boston, MA, Elsevier Science S.A. Jul. 12, 1999 pp 53–61.

*Continuous–Membrane Surface–Micromachined Silicon Deformable Mirror*, Bifano et al., Soc. of Photo–Optical Ins. Eng. Opt. Eng. 36(5) May 1997, pp 1354–1360.

*Mocro–Actuated Mirrors for Beam Steering*, Gustafson et al., SPIE—Society of Photo–Optical Instrumentation Engineering, vol. 3008, 1997, pp 90–99.

*Designs to Improve Polysilicon Micromirror Surface Topology*, Burns et al., SPIE—Society of Photo–Optical Instrumentation Engineering, vol. 3008, 1997, pp 100–110.

*Optical Beam Steering Using Surface Micromachined Gratings and Optical Phased Arrays*, Burns et al., SPIE, vol. 3131, 1997, pp 99–110.

*Investigation of the Maximum Optical Power Rating for a Micro–Electro–Mechanical Device*, Burns et al., Internat'l Conf. On Solid–State Sensors and Actuators Jun. 16, 1997–Jun. 19, 1997, pp 335–338.

*Development of Microelectromechanical Variable Blaze Gratings*, Burns et al., Elsevier Science S.A. Conf. On Solid–State Sensors and Actuators, 1998, pp 7–15.

*Optical Power Induced Damage to Microelectromechanical Mirrors*, Burns et al., Elsevier Science S.A. Conf. On Solid–State Sensors and Actuators, Sensors and Actuators A 70 (1998), pp 6–14.

*Micro–Electro–Mechanical Variable Blaze Gratings*, Burns et al., Air Force Institute of Technology, Dept. of Ele and Comp Eng., Wright–Patterson AFB, Ohio, pp 55–60.

*Polymeric Tunable Optical Attenuator with an Optical Monitoring Tap for WDM Transmission Network*, Lee et al., IEEE Photonics Tech. Ltrs, vol. 11, No. 5, May 1999, pp 590–592.

*Micromechanical Fiber–Optic Attenuator with 3μ Response*, Ford et al., IEEE, J. of Lightwave Technology, vol., 16, No. 9 Sep. 1998 pp 1663–1670.

*Modeling, Design, Fabrication and Measurement of a Single Layer Polysilicon Micromirror with Initial Curvature Compensation*, Min et al., Elsevier Science S.A., Sensors and Actuators 78 (1999) 8–17.

*Spectrally Selective Gas Cell for Electrooptical Infrared Compact Multigas Sensor*, Melendez et al., Elsevier Science S.A., Sensors and Actuators 46–47 (1995) 417–421.

*Silicon Micromachined Infrared Sensor wiht Tunable Wavelength Selectivity for Application in Infrared Spectroscopy*, D. Rossberg., Elsevier Science S.A., Sensors and Actuators 46–47 (1995) 413–416.

*Nonlinear Flexures for Stabel Deflection of an Electrostatically Actuated Micromirror*, Burns et al., Air Force Institute of Technology, Dept. of Ele and Comp Eng., Wright–Patterson AFB, Ohio, SPIE vol. 3226, 1997, pp 125–136.

*Synthetic Specra: A Tool for Correlation Spectroscopy*, Sinclair et al., Applied Optics, vol. 36, No. 15 May 20, 1997, pp 3342–3348.

*Synthetic Infrared Specra*, Sinclair et al., Optical Society of America, Optical Letters, vol. 22, No. 13 Jul. 1, 1997, pp 1036–1038.

*The Polychromator: A MEMS Correlation Spectrometer*, Hung et al., Microsystems Technology Laboratories Annual Report 1998.

*MEMS: Research and Applications in Microelectromechanical Systems*, Hung et al., Poster Session Guidebook, Mar. 31, 1998, pp 1 and 4.

*Extending the Travel Range of Analog–Tuned Electrostatic Actuators*, Hung et al., IEEE J. of Microelectromechanical Systems, vol. 8, No. 4, Dec. 1999, pp497–505.

Solgaard et al., "Deformable grating optical modulator," *Optics Letters*, vol. 17, No. 9, May 1, 1992, pp. 688–690.

Goossen et al., "Silicon Modulator Based on Mechanically–Active Anti–Reflection Layer with 1 Mbit/sec Capability for Fiber–in–the–Loop Applications," *IEEE Photonics Technology Letters*, vol. 6, No. 9, Sep. 1994, pp. 1119–1121.

Ford et al., "Dynamic Spectral Power Equalization Using Micro–Opto–Mechanics," *IEEE Photonics Technology Letters*, vol. 10, No. 10, Oct. 1998, pp. 1440–1442.

* cited by examiner

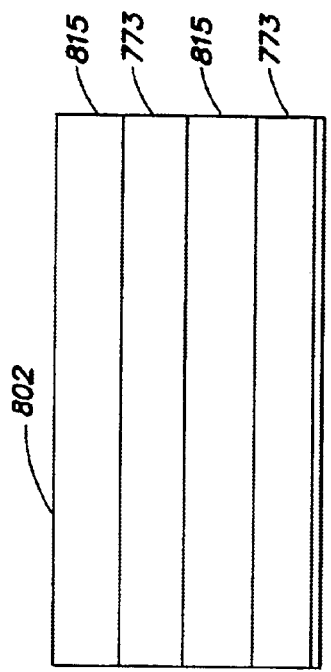
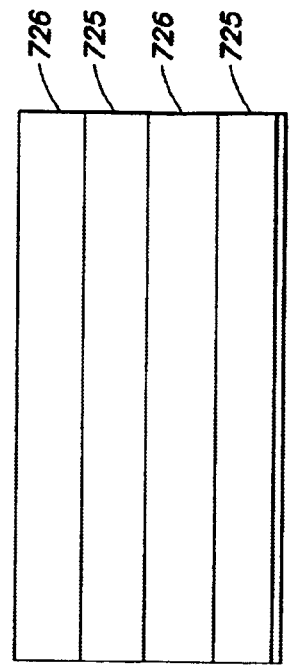
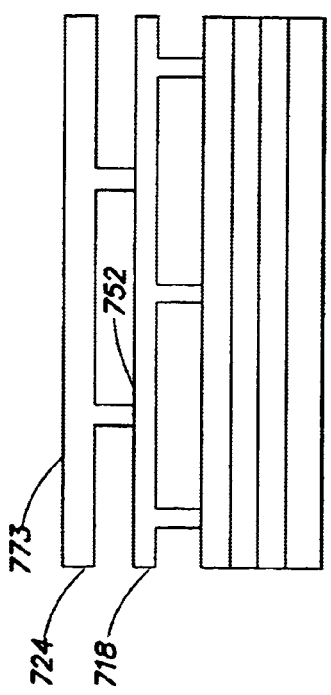
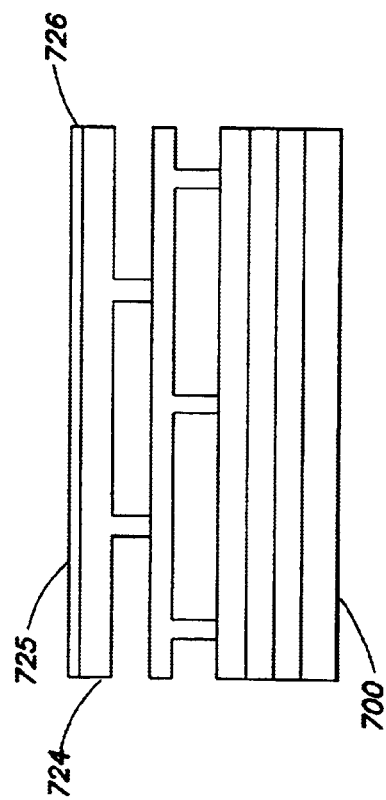

ACTUATABLE DIFFRACTIVE OPTICAL PROCESSOR

BACKGROUND OF THE INVENTION

1. Field of Invention

This invention relates to optical processors and more particularly to actuatable, diffractive optical processors.

2. Related Art

Microelectromechanical manufacturing techniques facilitate batch fabrication of microelectromechanical systems (or "MEMS") that have complex features and functions. Microscale sensing and actuation applications are particularly well addressed by MEMS.

For many MEMS applications, electrostatically-actuated structures are particularly effective as analog positioning and tuning components. Electrostatic actuation provides a combination of advantages for the microscale size regime of MEMS, including the ability to produce high energy densities and large force generation, as well as high operational speed, and the general ease of fabrication.

Electrostatic actuation of a structure is typically accomplished by applying a voltage between an electrode on the structure and an electrode separated from the structure. The resulting attractive electrostatic force between the electrodes enables actuation of the structure toward the separated electrode. This applied elecrostatic force is opposed by a mechanical restoring force that is a function of the structure's geometrical and material properties. Controlling the structure's position during actuation requires balancing the applied electrostatic force and mechanical restoring forces. A more detailed description of the forces existing in an electrostatic device and design applications thereof is given in numerous publications and, in part, in U.S. patent application Ser. No. 09/537,936 entitled "PRECISION ELECTROSTATIC ACTUATION AND POSITIONING," filed on Mar. 29, 2000 in the name of Elmer S. Hung, et al., which is hereby incorporated by reference.

MEMS have been used in numerous ways as optical processors, including uses as diffractive optical processors. Examples of applications of diffractive optical processors have included optical communications applications, and metrologic applications such as polychomators used in spectroscopic systems. In such applications, the actuatable structures of the MEMS optical processor device is constructed to function as an actuatable grating structure. Because the performance of grating-based optical processors is effected by movements of the grating structure on the order of hundredths of the wavelength of light to be processed by the device, the precise positioning of the structure is critical. If precise positioning is not maintained over the entire surface of the optical processor, the useable portion of the surface is limited to the portions that are precisely positioned.

An example of a diffractive optical processor is disclosed in U.S. Pat. No. 5,311,360 titled "Method and Apparatus for Modulating a Light Beam" issued May 10, 1994, by Bloom, et al. The optical processor disclosed by Bloom, et al. has a plurality of grating elements; each grating element is connected to a frame at both ends, but otherwise forming a free standing bridge between the two frame connections. An electrode is placed below each of the grating elements such that when a voltage is provided between a grating element and a corresponding electrode, the grating element is deflected toward the electrode. Because the grating element is connected at the ends, the deflected grating element forms a continuous curve, with the maximum deflection of the electrode occurring at the midpoint between the connections, and zero deflection occurring at the connections.

While the processor is able to achieve a selected deflection near the midpoint of the grating elements, the deflection of the remaining portions of the grating element is determined by the properties of the material from which the grating element made, and the distance between the connections. Accordingly, the useable portions of each of the grating elements in the optical processor is limited to a portion near the midpoints of the grating elements, where the surface has the selected deflection, and the grating approaches an appropriate flatness and orientation.

Other MEMS grating structures have allowed the grating elements to remain nearly planar during actuation, but structures necessary to maintain planarity have resulted in limitations in optical performance. FIG. 1 is a schematic top view of a MEMS diffractive optical processor 100 that illustrates a basic topography for prior art MEMS diffractive optical processors that maintains planarity of the grating elements during actuation. The top surface 101 of optical processor 100 includes gaps 115 and actuatable grating elements 110. Grating elements 110 are actuatable in the direction of the z-axis (i.e., perpendicular to the 30 top surface of optical processor 100) to control the diffractive characteristics of optical processor 100. Gaps 115 are fixed regions of the top surface of optical processor 100 that provide separation between grating elements 110, thus allowing actuation of neighboring grating elements 110 without mechanical interference.

The performance characteristics of diffractive optical processors, such as prior art diffractive optical processor 100, are affected by diffraction and scattering by the gaps 115. Accordingly, prior art MEMS-based optical processors having such a topography have had limitations in insertion loss, and dynamic range.

The following terms and phrases will have the following definitions throughout this specification. "Insertion Loss" is a measure of device efficiency, defined as the loss of optical energy in an optical signal, resulting from transmission by an optical device. Insertion loss is a measure of the total signal energy output from a device relative to the total signal energy input into the device, often expressed in decibels.

"Dynamic Range" of an analog device is a measure of the range of signal strengths over which a device can operate. Dynamic range is the span between the maximum signal strength attainable at the device output and the minimum signal strength attainable at the device output.

In many applications, it is desirable to maintain the strength of an input signal, independent of the polarization of the signal. The degree to which an optical device attenuates an input signal as a function of polarization is referred to as "Polarization-Dependent Loss" ("PDL"). Ideally, the PDL is zero.

SUMMARY OF THE INVENTION

Exemplary aspects of this invention include optical processors that eliminate the gaps between grating elements, while providing improved planarity of the grating elements during actuation of the optical processor's grating elements. Accordingly, embodiments of these exemplary aspects have reduced insertion loss, and increased dynamic range. Still other exemplary aspects of the invention provide reduced power consumption, and reduced cost of production of optical processors.

A first aspect of the invention is a diffractive optical processor having a substrate, and an axis normal to at least a portion of a surface of the substrate comprising a first mirror surface suspended over the substrate, at least a portion of the first mirror surface normal to the axis, the first mirror surface having two ends and displaceable in the direction of the axis, at least one support coupled to the first mirror surface at a point intermediate the ends of the first mirror surface; and a second mirror surface, at least a portion of the second mirror surface normal to the axis, the second mirror surface optically adjacent to first mirror surface, the second mirror surface separated from the first mirror surface a distance in the direction of the axis.

A second aspect of the present invention is a diffractive optical processor having a substrate, and an axis normal to at least a portion of a surface of the substrate comprising a plurality of first mirror surfaces, each having two ends, at least a portion of each of the plurality first mirror surfaces normal to the axis, and each suspended over the substrate and displaceable in the direction of the axis, a plurality of supports each coupled to a corresponding one of the plurality of first mirror surfaces at a point intermediate the ends of the corresponding one of the plurality of first mirror surfaces, and a plurality of second mirror surfaces, at least a portion of each of the plurality of second mirror surfaces normal to the axis, each of the second mirror surfaces optically adjacent to at least a corresponding one of the plurality first mirror surfaces, each of the plurality of second mirror surfaces separated from the corresponding one of the plurality of first mirror surface a corresponding distance in the direction of the axis.

A third aspect of the present invention is an electrostatically-actuated diffractive optical processor having a substrate, and an axis normal to at least a portion of a surface of the substrate comprising a plurality of first mirror surfaces, each having two ends, at least a portion of each of the plurality of first mirror surfaces normal to the axis, and each suspended over the substrate and displaceable in the direction of the axis, a plurality of supports each coupled to at least a corresponding one of the plurality of first mirror surfaces at a point intermediate the ends of the corresponding one of the plurality of first mirror surfaces, a plurality of actuation beams, each of the plurality of actuation beams suspended over the substrate to form a corresponding actuation gap, each of the plurality of actuation beams coupled to at least one of the plurality of supports to suspend a corresponding one of the plurality of first mirror surfaces over the substrate, each of the plurality of actuation beams including an actuation region displaceable through the corresponding actuation gap, a plurality of second mirror surfaces, at least a portion of each of the plurality of second mirror surfaces normal to the axis, each of the plurality of second mirror surfaces optically adjacent to at least a corresponding one of the plurality of first mirror surfaces, each of the plurality of second mirror surfaces separated from the corresponding one of the plurality of first mirror surfaces by a distance in the direction of the axis, and a plurality of electrodes, each provided on the substrate and corresponding to one of the plurality of actuation beams, wherein when a voltage is applied between one of the plurality of actuation beams and the corresponding one of the plurality of electrodes, the actuation region is displaced through the corresponding actuation gap, the corresponding first mirror element is displaced, and the distance is changed.

A fourth aspect of the present invention is a telecommunications system, for transmitting a wavelength division multiplexed signal, comprising a demultiplexer for separating the wavelength division multiplexed signal into a plurality of sub-signals, and a diffractive optical processor optically coupled to the demultiplexer for receiving and diffracting at least one of the plurality of sub-signals, the diffractive optical processor having a substrate and an axis normal to at least a portion of a surface of the substrate, a plurality of first mirror surfaces each having two ends and a portion of each of the plurality of first mirror surfaces normal to the axis and suspended over the substrate, and each of the plurality of first mirror surfaces displaceable in the direction of the axis, a plurality of supports each coupled to a corresponding one of the plurality of first mirror surfaces at a point intermediate the ends of the corresponding one of the plurality of first mirror surfaces, and a plurality of second mirror surfaces, a portion of each of the plurality of second mirror surfaces normal to the axis, each of the second mirror surfaces optically adjacent to at least a corresponding one of the plurality first mirror surfaces, each of the plurality of second mirror surfaces separated from the corresponding one of the plurality of first mirror surfaces a distance in the direction of the axis.

BRIEF DESCRIPTION OF THE DRAWINGS

Illustrative, non-limiting embodiments of the present invention will be described by way of example with reference to the accompanying drawings, in which the same reference numeral is used for common elements in the various figures, and in which:

FIGS. 7A–7I provide cross-sectional views of a simplified, exemplary fabrication sequence for producing an optical processor according to the present invention.

FIGS. 8A–8I provide top views of a simplified, exemplary fabrication sequence for producing an optical processor according to the present invention.

DETAILED DESCRIPTION OF THE INVENTION

Figure 1:
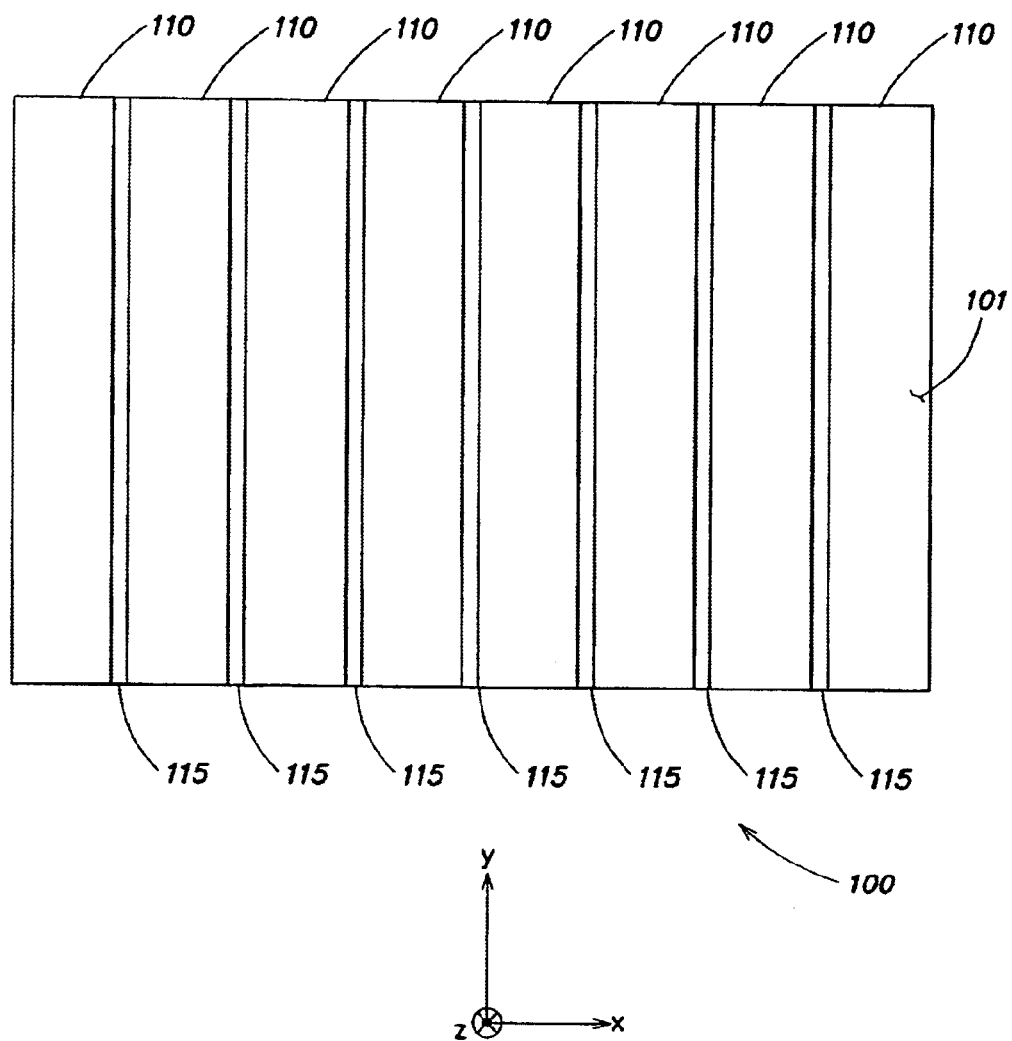
FIG. 1 is a schematic top view of a MEMS diffractive optical processor that illustrates the basic topography of a typical MEMS diffractive optical processor, according to the prior art.
Figure 2:
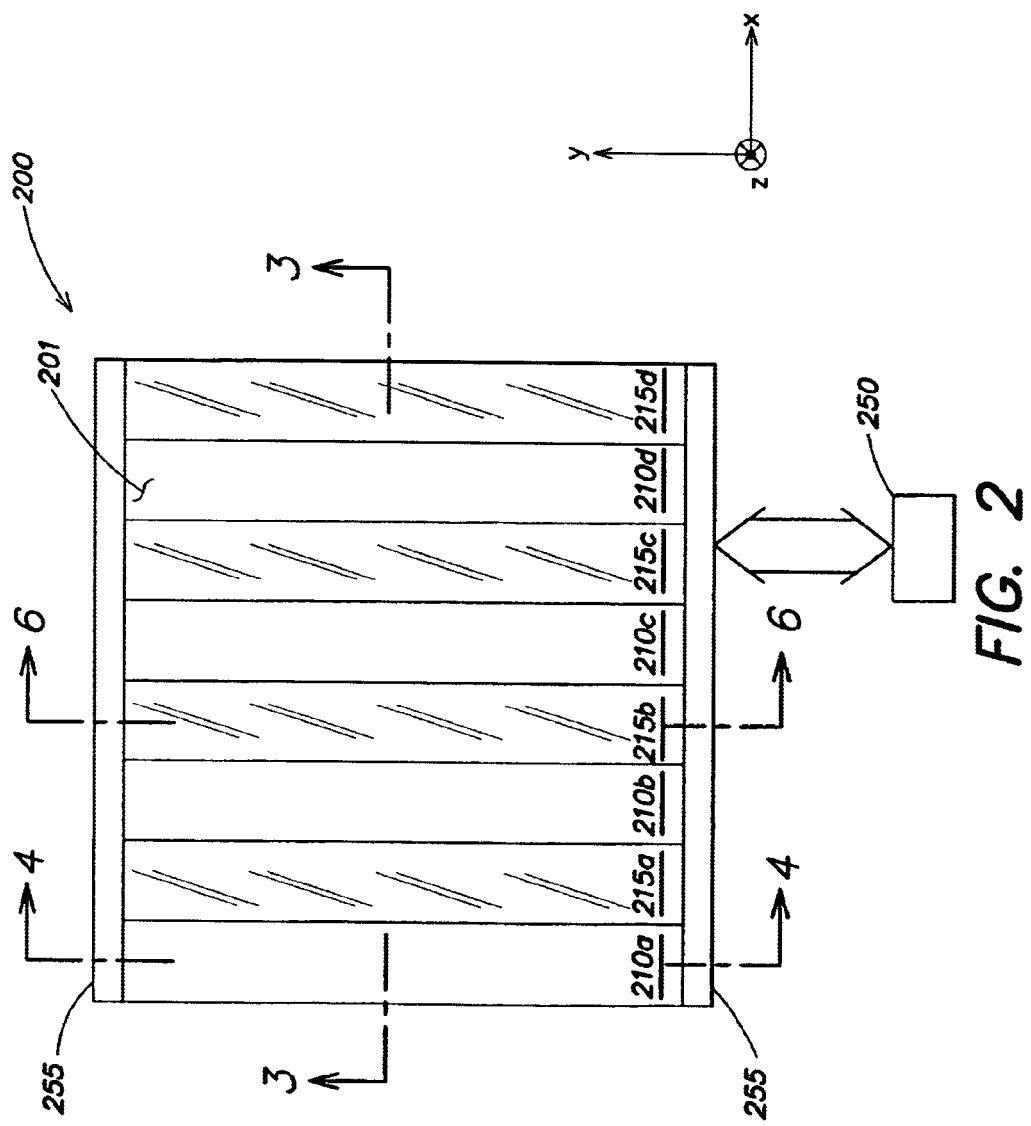
FIG. 2 is a top view of one example of one embodiment of an electrostatically-actuatable diffractive optical processor according to the present invention.
Figure 3:
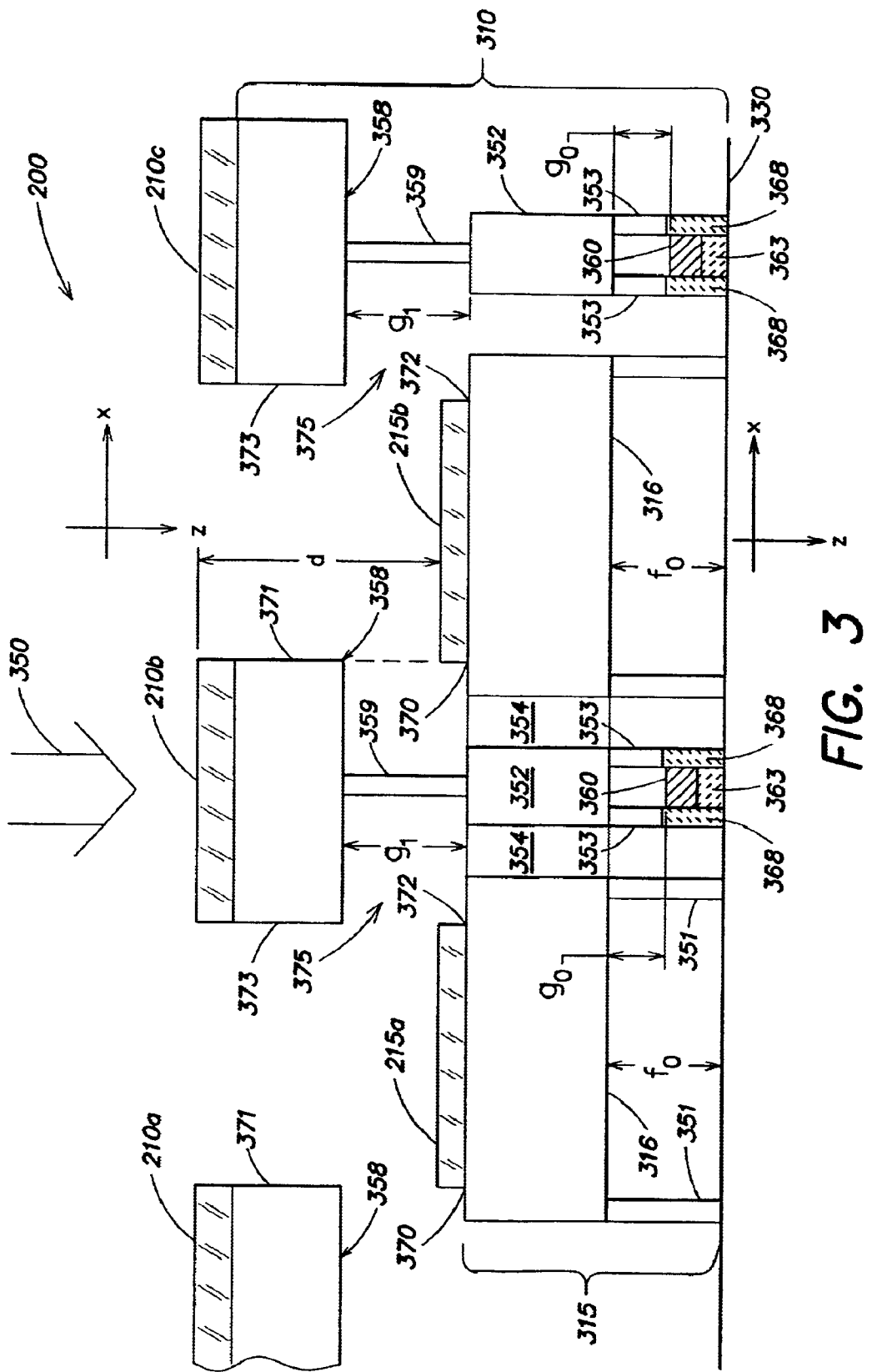
FIG. 3 is a cross-sectional side view of the diffractive optical processor of FIG. 2 taken along the line 3—3.

FIG. 2 is a top view of one example of one embodiment of an electrostatically-actuatable diffractive optical processor 200 according to the present invention. FIG. 3 is a cross-sectional side view of the diffractive optical processor of FIG. 2 taken along the line 3—3 that illustrates exemplary mirror surfaces 210a–c and 215a–b. Top surface 201 of optical processor 200 includes upper mirror surfaces 210a–d (collectively referred to as 210) and lower mirror surfaces 215a–d (collectively referred to as 215). Upper mirror surfaces 210 and lower mirror surfaces 215 have elongate dimensions in direction-y and widths in direction-x.

Although the upper mirror surfaces 210a–d and lower mirror surfaces 215a–d do not form a planar or continuous surface in direction-x, the phrase "top surface" will be used herein to refer to the upper mirror surfaces 210a–d and lower mirror surfaces 215a–d. In one embodiment of optical processor 200, the ends of upper mirror surfaces 210 and lower mirror surfaces 215 are connected to a frame 255.

Upper mirror surfaces 210 and lower mirror surfaces 215 that neighbor one another are "optically adjacent" for light projected onto optical processor 200 normally to top surface 201 (i.e., for light projected in the direction of the z-axis, illustrated as light 350 in FIG. 3). Surfaces that are optically adjacent for light of a specified angle of projection are located such that light projected onto the surfaces at the specified angle is projected onto one or the other surface, and substantially no light impinges on points between the surfaces. It should be understood that because the surfaces may be separated in the direction of the z-axis (also referred to simply as direction-z), an insubstantial portion of light from the specified angle may impinge on points other than on the optically adjacent surfaces (e.g., interstitial regions 375 and sidewalls 371, 373 in FIG. 3); such light may be deflected due to diffraction or scattering.

Upper mirror surfaces 210 are moveable relative to lower mirror surfaces 215, in direction-z. In one embodiment, mirror surfaces 210 are individually addressable, and individually actuatable in direction-z. A controller 250 is illustrated that is capable of generating electrical signals necessary to address and actuate individual mirror surfaces 210a–d. Controller 250 can be any known controller capable of generating electrical signals necessary to address and actuate mirror surfaces 210. Although optical processor 200 is illustrated having a select number of mirror surfaces 210, 215, it should be understood that an optical processor having any number of mirror surfaces is within the scope of this invention.

Although the widths of the upper mirror surfaces 210 and lower mirror surfaces 215 are illustrated as equal, the widths of the upper mirror surfaces 210 and lower mirror surfaces 215 can be varied as a function of their location along the x-axis (i.e., "chirped). For example, the widths of the mirror surfaces 210, 215 can be varied linearly as a function of x to accommodate the projection of beams of light onto optical processor 200, wherein the beams of light corresponds to channels of a WDM signal that are equally spaced as a function of frequency, and wherein the channels have been spatially separated by a diffraction grating.

Referring to FIG. 3, each of the mirror surfaces 210 is suspended over substrate 330 by a corresponding upper mirror suspension structure 310, and each of the mirror surfaces 215 is suspended by a corresponding lower mirror suspension structure 315. An interstitial region 375 exists between each upper mirror suspension structure 310 and any adjacent lower mirror suspension structures 315 to allow movement of upper mirror suspension structures 310 in direction-z.

The upper surfaces of mirror surfaces 210 and the upper surfaces of mirror surfaces 215 are separated by a distance d along direction-z. Mirror surfaces 210 and 215 are made to be optically adjacent by extending each mirror surface 215 on one of mirror beams 316 at least from a corresponding point 370, which corresponds to an extension in direction-z of a corresponding one of sidewalls 371, to a point that is a finite distance away in the direction of a corresponding one of points 372, and by extending each mirror surface 215 at least from a corresponding point 372, which corresponds to an extension in direction-z of a corresponding one of sidewalls 373, to a point that is a finite distance away in the direction of a corresponding one of points 370.

It should be understood that the present invention includes the possibility that a given one or more of mirror surfaces 215 can be continuous between the corresponding points 370 and 372, or may have one or more discontinuities between corresponding points 370 and 372. It should also be understood that present invention includes the possibility that a given one or more of mirror surfaces 210 can be continuous between the corresponding sidewalls 371 and 373, or may have one or more discontinuities between corresponding points 371 and 373.

In one embodiment, mirror surfaces 215 cover the widths of the top surfaces of mirror beams 316 from edge to edge; alternatively, portions of mirror beams 316 beyond points 370 and 372 may not be covered by mirrored surface 215. In other embodiments, either one or both of sidewalls 371 and 373 are covered by mirrored surfaces.

In the case of two neighboring mirror surfaces, such as mirror surfaces 210b and 215a, the mirror surfaces 210b, 215a are made to be optically adjacent by extending mirror surface 210b at least from a corresponding one of sidewalls 373 to a point that is a finite distance away in the direction of a corresponding one of sidewalls 371, and by extending mirror surface 215a at least from a corresponding one of points 372 to a point that is a finite distance away in the direction of a corresponding one of points 370.

Figure 4:
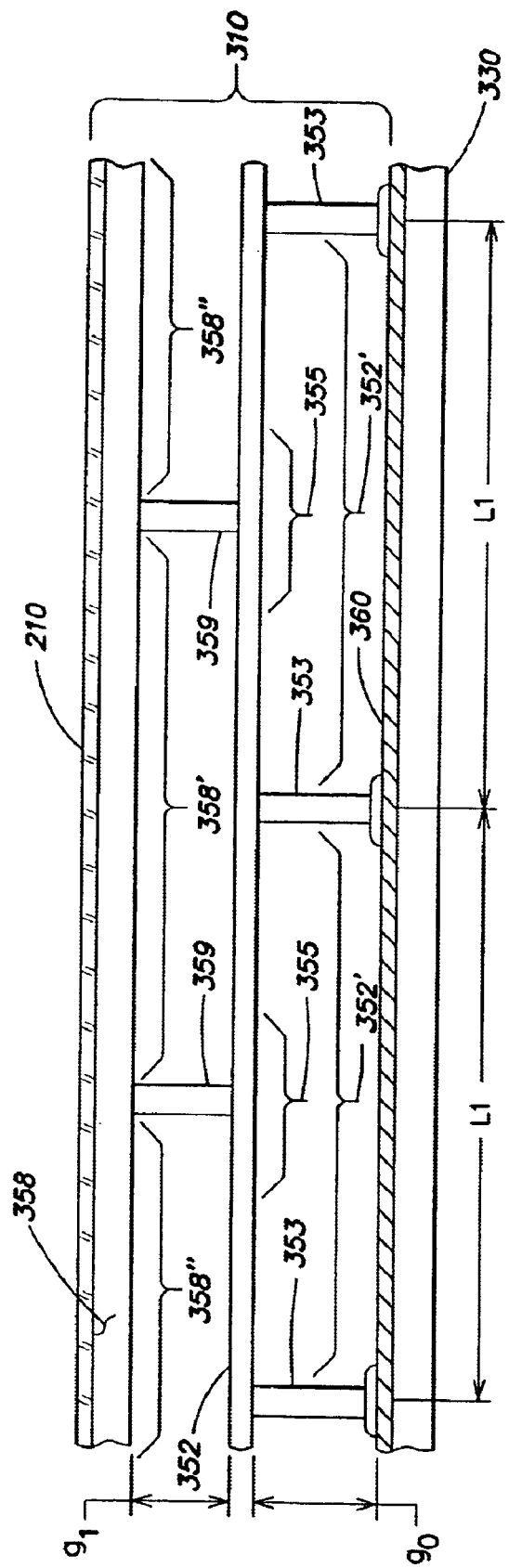
FIG. 4 is a cross-sectional side view of an upper mirror suspension structure having an unactuated actuation beam taken along the line 4—4 of FIG. 2.

As described in greater detail in FIG. 4, each upper mirror suspension structure 310 is constructed to enable displacement of a corresponding one of mirror surfaces 210 in direction-z in a manner that allows maintenance of the planarity of at least a portion of the corresponding one of mirror surfaces 210 and maintenance of optical adjacency of corresponding mirror surfaces 210 and 215.

Each upper mirror suspension structure 310 includes an auxiliary beam 358, one or more auxiliary support posts 359, an actuation beam 352, and one or more actuation beam support posts 353. Actuation beam support posts 353 are optional; as discussed below, in an alternative embodiment, support posts 353 are omitted. In another alternative embodiment, auxiliary beams 358 are formed of a reflective material (e.g., aluminum), wherein each auxiliary beam 358 and a corresponding one of the upper mirror surfaces 210 are integrated into a single feature made of a single material, and the upper portion of each auxiliary beam 358 forms a corresponding upper mirror surface 210.

Each auxiliary beam 358 is suspended over an actuation beam 352 by auxiliary beam support posts 359. Accordingly, auxiliary gaps $g_1$ are formed between auxiliary beams 358 and actuation beams 352. It should be understood that the auxiliary gaps in optical processor 200 may be all equal in size or different.

Each actuation beam 352 is constructed of an electrically conducting material or alternatively is constructed of multilayers wherein at least one layer is conducting or capable of holding charge, and is suspended over substrate 330 by actuation beam support posts 353. Accordingly, actuation gaps $g_0$ are formed between actuation beams 352 and electrodes 360. It should be understood that the actuation gaps in optical processor 200 may be all equal in size or different. As described in the fabrication sequence below, substrate 330 may be deposited with one or more insulating layers; any such layers are not shown, to avoid obfuscation.

Each electrically-conducting electrode 360 is provided on the surface of the substrate 330, isolated from the substrate by an insulating layer 363. If the support posts 353 are formed of an electrically-conducting material, the actuation beam support posts 353 each can be electrically-isolated from electrodes 360 by an insulating support bases 368. If the actuation beams supports are formed of an insulating material support bases 368 are not required.

The above is a description of one embodiment of the structure of electrodes 360 and upper mirror suspension structures 310; however, it should be understood that electrodes 360 and upper mirror suspension structures 310 can be any electrodes or suspension structures that are capable of actuating actuation beams 352 in the z-direction, while maintaining planarity of at least a portion of the corresponding mirror surface 210, including any structure as described in U.S. patent application Ser. No. 09/537,936 entitled "PRECISION ELECTROSTATIC ACTUATION AND POSITIONING," which has been incorporated by reference.

Actuation of an actuation beam 352 is achieved by applying a voltage V between an actuation beam 352 and a corresponding electrode 360. As further described with reference to FIG. 5 below, voltage V causes a flexure of the actuation beam 352, such that a corresponding actuation region 355 of one of the actuation beams 352 is displaced through actuation gap $g_0$ toward the substrate 330, resulting in a change in the distance d.

The distance d corresponding to an unactuated actuation beam 352 is typically approximately equal to the wavelength of light 350. If distance d corresponding to an unactuated actuation beam 352 is selected to be slightly greater than one wavelength of light, a bias voltage V can be applied to achieve distance d equal to one wavelength of light, by varying voltage V and observing maximum energy in the zeroth diffractive order of light 350 that is diffracted from optical processor 200. Optical processors having a distance d corresponding to an unactuated actuation beam 352, that is greater than and not approximately equal to the wavelength of light 350 are also useful because many of the optical characteristics of optical processor 200 repeat as distance d is changed by a integer multiple of one half of a wavelength of light 350, and because a bias voltage V can be applied to vary distance d.

A bias voltage V can be applied to achieve a distance d equal to $\lambda(n/2)$ (where n is an integer, and $\lambda$ is equal to the wavelength of light 350), by varying voltage V and observing maximum energy in the zeroth diffractive order of light 350 that is diffracted from optical processor 200. In one embodiment, optical processor 200 is operated by varying distance d between a selected distance d that is equal to $\lambda(n/2)$ and a distance d equal to $\lambda(2n-1)/4$ by varying voltage V and obtaining a minimum energy in the zeroth diffractive order of light 350 when light 350 is diffracted by optical processor 200.

Lower mirror suspension structures 315 include mirror beams 316 suspended a fixed distance $f_0$ over substrate 330 by support posts 351. The widths of mirror beams 316 may extend to points corresponding points 370 and 372, or may extend beyond corresponding points 370 and 372 so as to underlap auxiliary beam 358. As described in the fabrication sequence below, on the regions of the substrate 330 below lower mirror suspension structures 315, substrate 330 may be deposited with one or more conduction layers or insulating layers; any such layers are not shown, to avoid obfuscation.

In the present example embodiment of the invention, lower mirror suspension structures 315 suspend lower mirror surfaces 215 a fixed distance $f_0$ over substrate 330 (i.e., mirror beams 316 are not actuatable); however, it should be understood that embodiments having actuatable lower mirror suspension structures are within the scope of this invention. Also, although optical processor 200 is illustrated with lower mirror surfaces 215 a fixed distance $f_0$ over substrate 330 and upper mirror surfaces 210 actuatable, in other embodiments of optical processor 200, the upper mirror surfaces are suspended over substrate 330 a fixed distance and lower mirror surfaces are actuatable. It should be understood that the fixed distances $f_0$ in optical processor 200 may be all equal in size or different.

In an alternative embodiment, actuation beam support posts 353 of upper mirror suspension structure 350 can be omitted by coupling actuation beams 352 to two neighboring mirror beams 316, such as at coupling regions 354. Coupling the actuation beams 352 in such a manner allows the actuation beams 352 to be suspended above substrate 330 by one or more mirror beams 316 and eliminates the need to form support posts 353 and the need to include insulating support bases 368, thus simplifying the fabrication process.

Although surfaces 210 and 215 are optically adjacent for light projected onto the optical processor normally to top surface 201, advantages of such optical processors may be recognized when they are operated with light that is projected other than normally to the top surface 201. However, for light projected other than normally onto top surface 201, a portion of the light projected onto optical processor 200 will impinge on sidewalls 371, 373 and interstitial areas 375. Additionally, although it is generally advantageous to have the widths of the upper mirror surfaces 210 equal to widths of the lower mirror surfaces 215 for systems designed to operate with light projected normally to top surface 201, when an optical processor is designed to operate with light projected other than normally to top surface 201, it may be advantageous to make the widths of lower mirror surfaces 215 larger than the widths of upper mirror surfaces 210 to compensate for shadowing of lower mirror surfaces 215.

FIG. 4 is a cross-sectional side view taken along the line 4—4 of FIG. 2. FIG. 4 includes an upper mirror suspension structure 310 having an unactuated actuation beam 352. An exemplary one of upper mirror surfaces 210 is included for clarity; and frame 255 is omitted to avoid obfuscation. Two actuation beam segments 352' of a plurality of actuation beam segments 352' of the actuation beam 352 are coupled to one or more support posts 353 to suspend upper mirror surface 210 over substrate 330, each actuation beam segment 352' having a common length, $L_1$. Although actuation beam segments 352' of actuation beam 352 are illustrated having a common length, actuation beams comprised of actuation beam segments having different lengths are within the scope of this invention. Also, optical processors comprised of a first actuation beam having beam segments of a given length, and a second actuation beam having beam segments of a different length are within the scope of this invention. FIG. 4 illustrates that each actuation beam segment 352' is suspended over the substrate by support posts 353 forming an actuation gap $g_0$ between the actuation beam segments 352 and electrode 360, and including an actuation region 355 displaceable through the actuation gap $g_0$.

Although actuation beam 352 is illustrated having two actuation beam segments 352', upper mirror suspension structures 310 having one or more actuation beam segments 352' are within the scope of this invention. Also, although, actuation beam segment 352' is illustrated as extending from a first support post 353 to an adjacent support post 353, it should be understood that an actuation beam segment 352' may be suspended by a single support post 353, in any manner such that the actuation beam segment 352' extends a finite distance from support post 353.

Upper mirror surface 210 is formed on an auxiliary beam 358. One or more support posts 359 are coupled to the actuation beam 352 and the auxiliary beam 358, forming auxiliary gap, $g_1$. Accordingly, upper mirror surface 210 is suspended over substrate 330, at one or more points intermediate the ends of upper mirror surface 210 by one or more support posts 359, at least a portion of mirror surface 210 intermediate the ends of mirror surface 210 is normal to the z-axis.

One complete auxiliary beam segment 358' and two partial auxiliary beam segments 358" of a plurality of auxiliary beam segments of the upper mirror support structure 310 are illustrated. Although auxiliary beam 358 is illustrated having three auxiliary beam segments 358', 358", any auxiliary beam 358 having one or more actuation beam segments 358' is within the scope of this invention. Also, although auxiliary beam segment 358' is illustrated as extending from a first auxiliary support post 359 to an adjacent support post 359, it should be understood that an auxiliary beam segment may be suspended by a single support post 359, in any manner such that the auxiliary beam segment 358' extends a finite distance from support post 359. Auxiliary beams comprised of auxiliary beam segments having different lengths are also within the scope of this invention.

Figure 5:
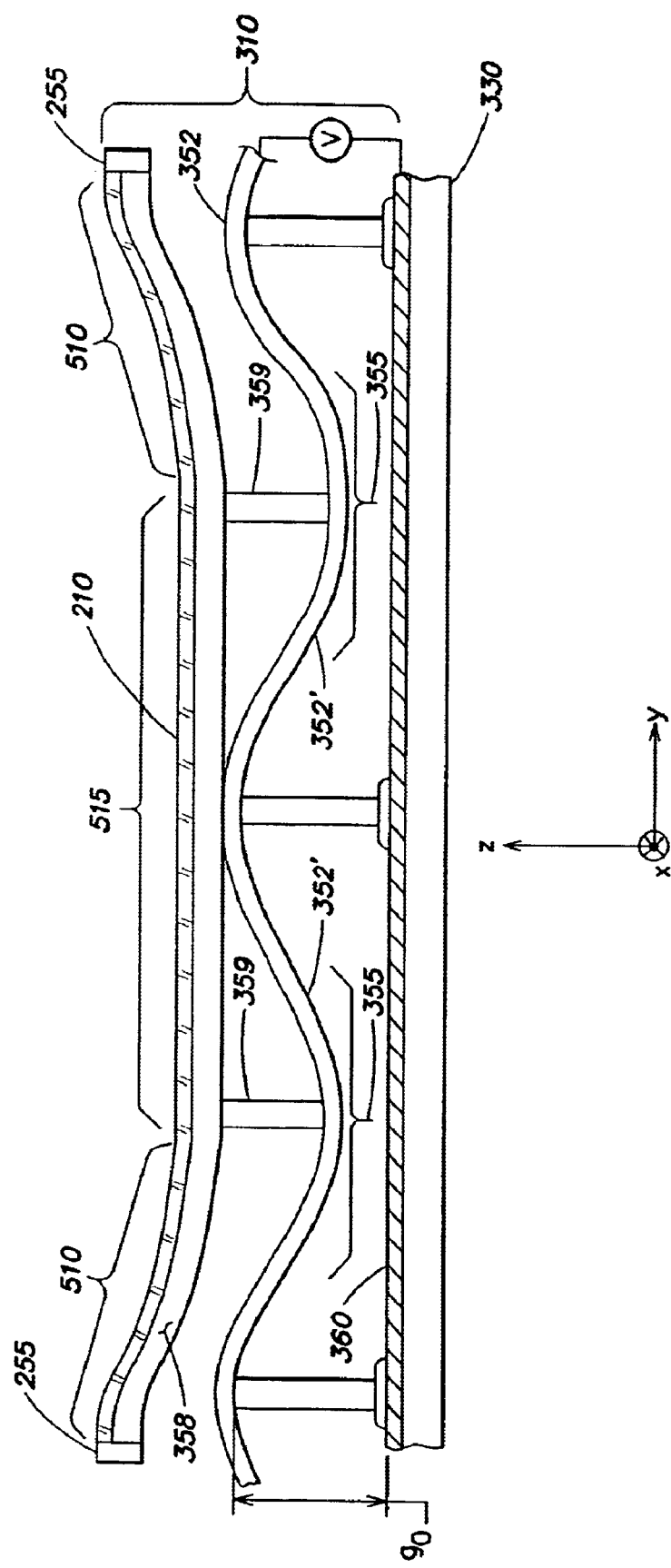
FIG. 5 is a cross-sectional side view of an upper mirror suspension structure having an actuated actuation beam taken along the line 4—4 of FIG. 2.

FIG. 5 is a cross-sectional side view taken along the line 4—4 of FIG. 2 of an upper mirror suspension structure 310 having actuated actuation beam 352. An exemplary mirror surface 210 is included for clarity. When, in the manner discussed above with reference to FIG. 3, an actuating voltage V is applied between the actuation beam 352 and electrode 360, the actuation region 355 of each actuation beam segment 352' is displaced through the actuation gap, thus displacing the mirror surface 210 toward the substrate 330 along the z-axis. Planarity is maintained along portion 515 of auxiliary beam 358 during downward displacement of the actuation beams segments 352', such that mirror surface 210 is normal to the z-axis, because the support posts of the auxiliary beam move downward in unison.

In embodiments of optical processors having a frame 255, the ends of auxiliary beam 358 are coupled to frame 255 and are maintained a fixed distance above substrate 330. Because mirror surface 210 is formed on auxiliary beam 358, the ends of mirror surface 210 are coupled to the frame 255 and are also maintained a fixed distance above substrate 330. Accordingly, the auxiliary beam 358 and mirror surface 210 tend to curve during actuation. Although the mirror surface 210 tends to curve, at least a portion of mirror surface 210 intermediate the ends of mirror surface 210 is normal to the z-axis.

The curvature in mirror surface 210 and auxiliary beam 358 is caused to be altered by auxiliary support posts 359. For the purpose of this invention an altered curvature is a curvature that is other than the curvature formed by a structure having both ends connected to a fixed structure, but otherwise forming a free standing bridge between the connected ends. While upper mirror suspension structure 310 is illustrated having two support posts 359, it should be understood that upper mirror suspension structures having one or more support posts 359 are within the scope of this invention.

In one embodiment, portion 515 of mirror surface 210 and auxiliary beam 358 is caused to be substantially planar by support posts 359, and the curvature is confined to a region 510. A substantially planar surface is a surface whose deviation from planarity, as measured from maximum to minimum points on the relevant portion of surface is less than or equal to one-hundredth of the wavelength of operation.

The degree of planarity achieved by a given structure is dependent on numerous factors including the materials and processing techniques used to construct auxiliary beam 358 and support posts 359, the dimensions of auxiliary beam 358 and support posts 359, and the number of support posts 359 intermediate the ends of auxiliary beam 358 (i.e., intermediate the connections to frame 255). Typically, the degree of planarity achievable by a given structure is directly proportional to the number of support posts 359 intermediate the ends of auxiliary beam 358. As one of ordinary skill in the art would understand, the planarity of a given structure can be determined by numerous means, including a position-sensitive sensor or an interference microscope.

The construction of the various geometric features of upper mirror suspension structure 310 and electrode 360 to achieve a desired travel range of upper mirror surface 210 upon the application of an actuation voltage V can be achieved by appropriately selecting material and geometries according to U.S. patent application Ser. No. 09/537,936 entitled "PRECISION ELECTROSTATIC ACTUATION AND POSITIONING," which has been incorporated by reference.

Figure 6:
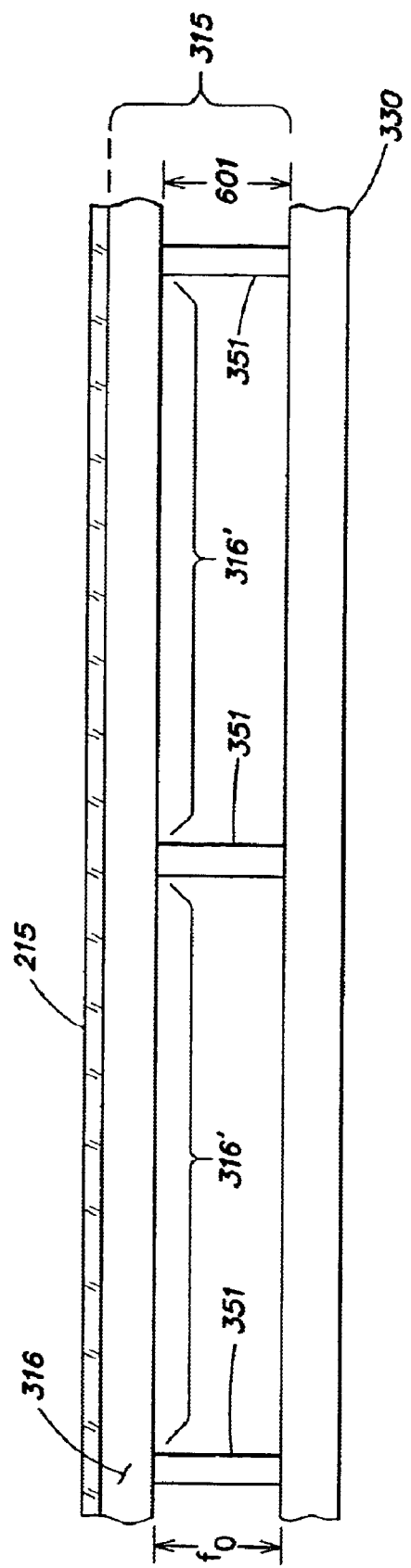
FIG. 6 is a cross-sectional side view of a lower mirror suspension structure taken along the line 6—6 of FIG. 2.

FIG. 6 is a cross-sectional side view taken along the line 6—6 of FIG. 2. FIG. 6 illustrates a lower mirror suspension structure 315, including a mirror beam 316. An exemplary mirror surface 215 is included for clarity. Mirror beam 316 is comprised of one or more mirror beam segments 316'. As discussed above, lower mirror suspension structure 315 suspends lower mirror surface 215 a fixed distance 601 above substrate 330 by support posts 351, thus forming a beam gap $f_0$.

Although, lower mirror suspension structure segments 316' is illustrated as extending from a first auxiliary support post 351 to an adjacent support post 351, it should be understood that lower mirror suspension structure segments 316' may be supported by a single support post 351, such that the auxiliary beam segment 316' extends a finite distance from support post 351. Also, although lower mirror suspension structure 315 is illustrated as suspending mirror surface 215 a fixed distance above substrate 330 (i.e., lower mirror suspension structure 315 is unactuatable), embodiments of optical processors having an actuatable lower mirror suspension structure are within the scope of this invention. Even if lower mirror suspension structure 315 is actuatable, at least a portion of mirror surface 215, intermediate the ends of mirror surface 215, is normal to the z-axis FIGS. 7A–7I and FIGS. 8A–8I will be discussed in conjunction with one another to describe a simplified, exemplary fabrication sequence for producing an optical processor such as the example embodiment of the present invention described above. The fabrication sequence discussed corresponds to the alternative embodiment discussed with reference to FIG. 3, wherein actuation beam support posts 353 of upper mirror suspension structure 350 are omitted by coupling actuation beam 352 to mirror beam 316 of the lower mirror suspension structure 315; accordingly, formation of support posts 353 is unnecessary. FIGS. 7A–7I provide cross-sectional views, corresponding to a view along line 4—4 of FIG. 2, of an example fabrication sequence for producing an embodiment of one example of an optical processor according to the present invention. FIGS. 8A–8I provide top views of an example fabrication sequence for producing an embodiment of one example of an optical processor according to the present invention. Some features illustrated in FIGS. 7A–7I and FIGS. 8A–8I are only visible though other features; such features are included for completeness, and will be indicated as visible through another feature. Reference will be made to features of optical processor 200 in FIG. 3 where helpful.

Figure 8A:
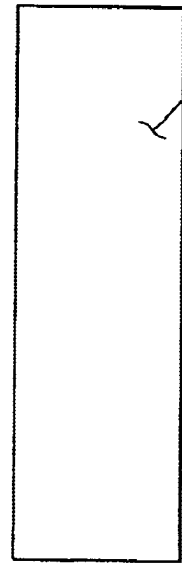
Figure 7A:
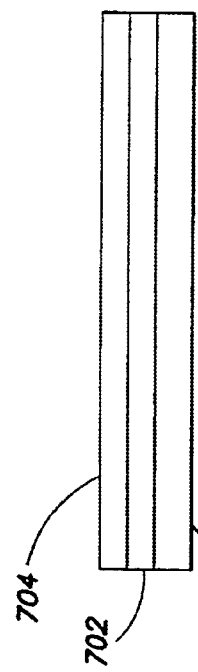

Referring to FIG. 7A, a starting material of, e.g., a 4-inch (10.16 cm) p-type or n-type silicon wafer is provided as a substrate 700. It is preferable that the wafer thickness vary over a die area by much less than the optical wavelengths of interest. A layer 702 of silicon dioxide, e.g., of about 0.5–1.0 micrometers or thicker, is thermally grown on the substrate, and a layer 704 of silicon nitride of, e.g., about 0.1–1.0 micrometers is formed by low pressure chemical vapor deposition (LPCVD). These layers together form the electrical isolation of the substrate. As shown in FIG. 8A, a uniform silicon nitride layer 704 covers silicon wafer 700; layer 702 is not visible.

Figure 8B:
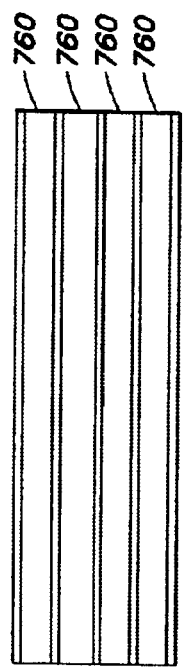
Figure 7B:
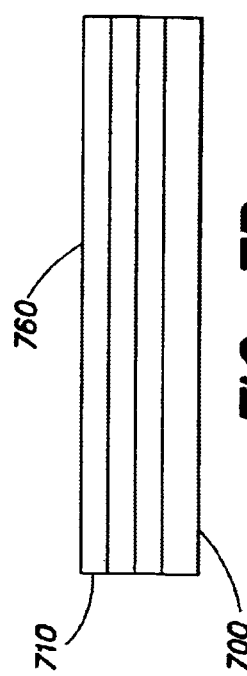

As shown in FIG. 7B, a polysilicon layer 710, of for example, 0.5 μm in thickness, is then deposited by LPCVD, doped by implantation, and patterned to form the actuating electrodes 760 (corresponding to electrode 360 in FIG. 3). FIG. 8B illustrates actuating electrodes 760. While electrodes 760 are formed over substantially the entire top surface (i.e., electrodes are formed over regions corresponding to actuation beams (not yet formed; 352 in FIG. 3) and mirror beams (not yet formed; 316 in FIG. 3), the electrodes corresponding to mirror beams are optional; however, the electrodes corresponding to mirror beams function to maintain the thickness of semiconductor structure, and are preferably deactivated (e.g., grounded) during use of an optical processor so formed. As one of ordinary skill in the art would understand, electrodes 760 are electrically coupled to bond pads or to conventional, integrated processing circuitry integrated on substrate 700, to form the electrical connections for the operation of the optical processor (i.e., displacement of the mirror surfaces).

Figure 8C:
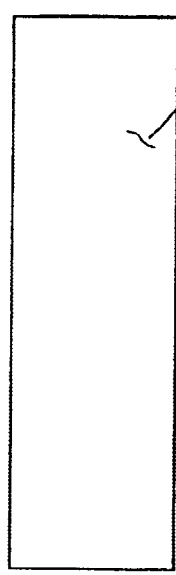
Figure 7C:
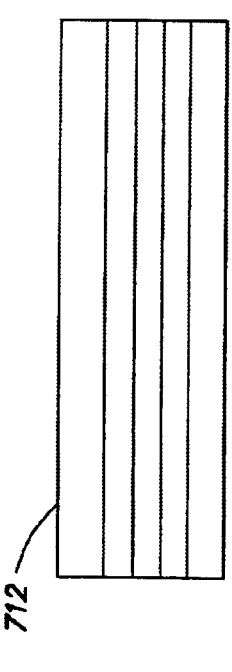

Referring to FIG. 7C, a sacrificial oxide layer 712, e.g., a layer of oxide with a thickness of about 2.0 μm is deposited or grown to define the actuation gap (corresponding to $g_0$ in FIG. 3). Any method of oxide deposition or growth now known or later developed can be used to form oxide layer 712. FIG. 8C illustrates the oxide layer 712 that will form actuation gaps $g_0$ and fixed gaps (corresponding to $f_0$ in FIG. 3).

Figure 8D:
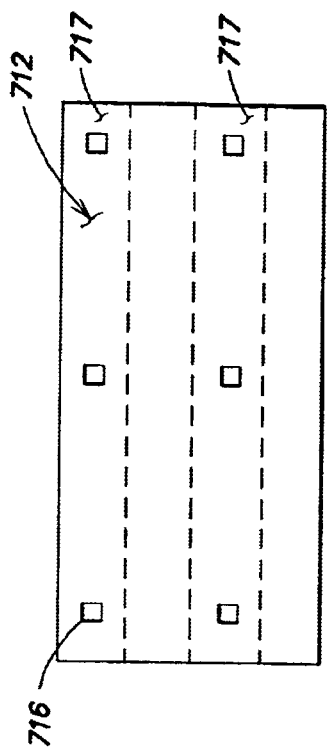
Figure 7D:
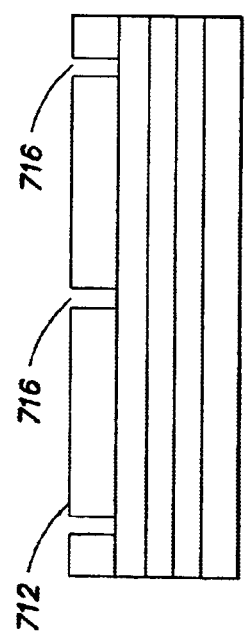

In an oxide etch step, shown in FIG. 7D, mirror beam support post windows 716 are etched through the entire thickness of the oxide layer 712 to define the locations and the dimensions of the support posts (corresponding to beam support posts 351). For example, the support post windows are placed at regular intervals along the length of the mirror beam, and have a square cross section with side dimensions approximately equal to the width of the mirror beams e.g., 10 micrometers. In FIG. 7D, mirror beam support post windows 716 are visible through oxide layer 712. FIG. 8D illustrates that beam support post windows 716 are formed in oxide layer 712 in regions 717 of oxide layer 712 that correspond to fixed gaps (corresponding to $f_0$ in FIG. 3).

Figure 8E:
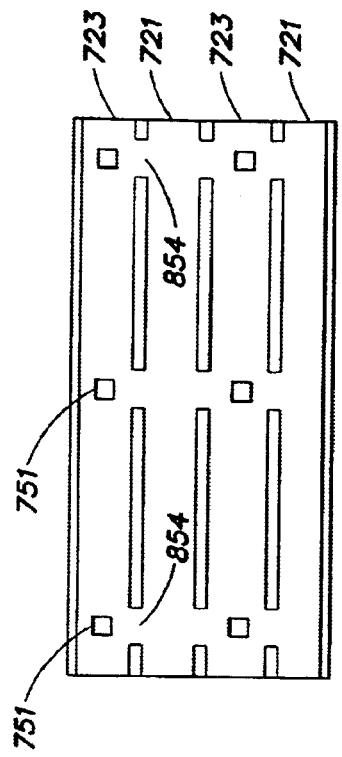
Figure 7E:
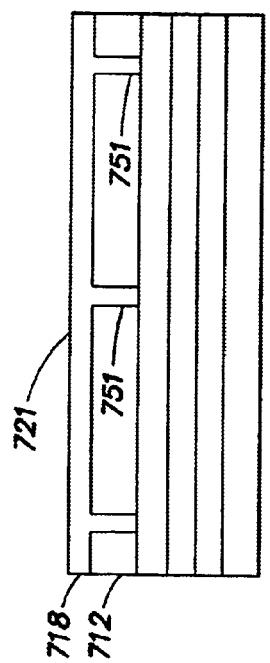

Referring to FIG. 7E, a polysilicon layer 718 of, e.g., 2.0 μm in thickness, is then deposited to form rows of actuation beams 721 (corresponding to actuation beam 352 in FIG. 3), mirror beams (not visible in FIG. 7E; corresponding to mirror beam 316 in FIG. 3), and support posts 751 (corresponding to the mirror beam support posts 351 in FIG. 3). For example, the width of the mirror beams is 10 micrometers and the actuation beams are 5 micrometers. Support posts 751 are visible through oxide layer 712. Polysilicon layer 718 is doped by implantation. As illustrated in FIG. 8E. alternating rows of actuation beams 721 beam and mirror beams 723 are formed. Coupling regions 854 (corresponding to coupling regions 354 in FIG. 3) provide coupling between the actuation beam 721 and mirror beams 723 to allow the actuation beams 721 to be suspended by neighboring mirror beams 723. In FIG. 8E, support posts 751 are visible through mirror beams 723.

Figure 8F:
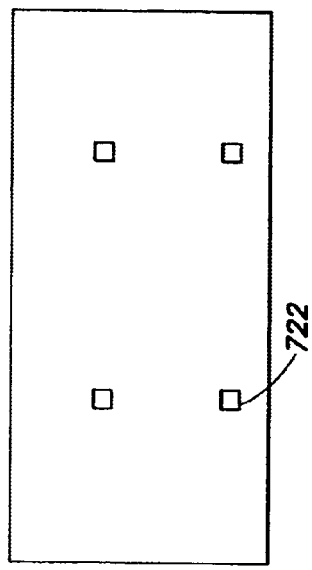
Figure 7F:
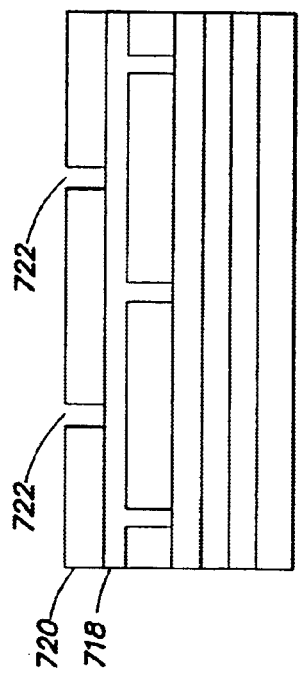

Turning to FIG. 7F, a sacrificial oxide layer 720, e.g., a layer of oxide of 2.0 μm in thickness, is deposited or grown on the polysilicon layer 718 using any known growth or deposition method, and patterned to define support post windows 722 (corresponding to support posts 359 in FIG. 3) which are etched through the entire thickness of the oxide layer 720. For example, the support post windows 722 are placed at regular intervals along the length of the actuation beam, and have a square cross section with side dimensions approximately equal to the width of the actuation beams e.g., 5–6 micrometers. Oxide layer 720 corresponds to auxiliary gap $g_1$ in FIG. 4. FIG. 8F illustrates the formation of post windows 722 in the region corresponding to auxiliary gap $g_1i$.

Figure 8G:
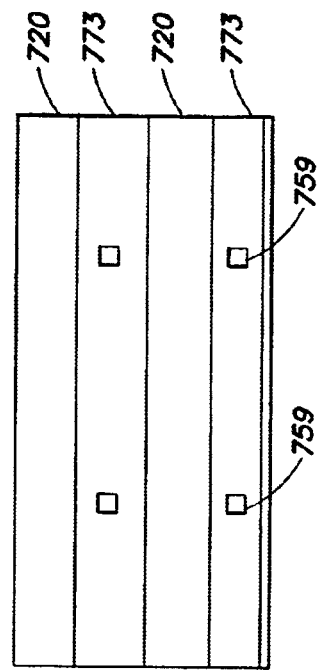
Figure 7G:
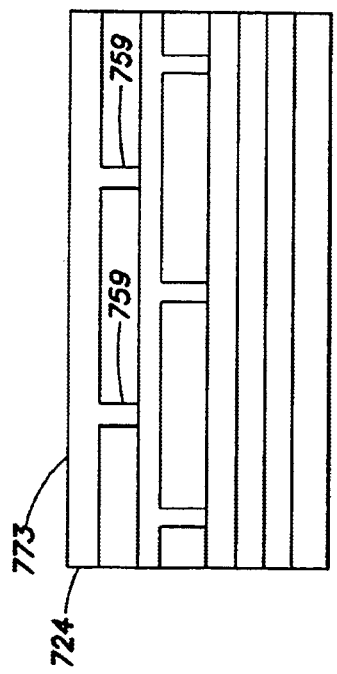

As shown in FIG. 7G, a polysilicon layer 724 is deposited and etched to form an auxiliary beam 773 (corresponding to 373 as shown in FIG. 3) and an auxiliary support post 759 (corresponding to 359 as shown in FIG. 3). As noted above, the degree of planarity achievable by a given fabrication sequence increases with the number of support posts 759 intermediate the ends of auxiliary beam 773, and is dependent on numerous factors, including materials and processing techniques. For simplicity, FIG. 7G is illustrated having two support posts 759; in one exemplary embodiment of an optical processor having a frame (not shown), the number of support posts 759 is selected to be four and the region between the middle posts is the region of substantial planarity. However, one of ordinary skill in the art would understand that optical processors having one or more support posts 759 and having regions of substantial planarity that span one or more support posts 759 are within the scope of this invention. FIG. 8G illustrates the patterning of polysilicon layer 724 to form auxiliary beams 773 (corresponding to 373 as shown in FIG. 3). The etching exposes oxide layer 720 in the regions of the mirror beams. In FIG. 8G, support post 759 is visible through auxiliary beams 773.

The fabricated structure is then annealed, e.g., at a temperature of about 900–1100° C. for, e.g., about 5 hours. Preferably, the annealing time and temperature are optimized for the particular mechanical and materials properties of a given structure, in the conventional manner. With such optimization, the annealing process enables reduction of the residual stress in the mechanical polysilicon layers to near zero. Following annealing, films produced by the fabrication deposition sequence (the films are not shown in the figures to avoid obfuscation) are then removed from the backside of the wafer with consideration for substrate warpage, in a conventional manner.

In the step corresponding to FIG. 7H, the fabricated structure is etched to release polysilicon layers 718 and 724 and thereby free actuation beams 752, auxiliary beams 773, and mirror beams (not visible).

The etch may be performed, for example, using a 49% HF solution. The fabricated structure is then diced. The suspended actuation beam rows and mirror beam rows result. Optionally, the fabricated structure is freeze-dried to avoid stiction of the actuation beams 752 and auxiliary beams 773 to the substrate. In another embodiment, a self-assembled monolayer (SAM) is applied to polysilicon layers 718 and 724 to avoid stiction.

FIG. 8H illustrates die 802 having two mirror beams 815 and two auxiliary beams 773. Although the illustrated dies are illustrated having two mirror beams 815 and two auxiliary beams 773, die 802 can have one or more mirror beams 815, and one or more auxiliary beams 773. In one embodiment, four-hundred auxiliary beams 773 and mirror beams 815 form a single die.

Referring to FIG. 7I, an optically reflective coating 726 is deposited from above substrate 700 on the polysilicon layers 724 to form upper mirror surface 725 (corresponding to upper mirror surface 210 in FIG. 3) and to form lower mirror surfaces (not visible; corresponding to lower mirror surface 215 in FIG. 3). For example, a 200 Å-thick layer of chrome is deposited, followed by a 5000 Å-thick layer of gold.

FIG. 8I illustrates that by performing the metal deposition from directly above the substrate, the metalization process enables self-alignment of the upper mirror surface 725 and lower mirror surface 726, thus forming mirrored surfaces that are optically adjacent for light projected normally on the top surface of the optical processor. The width of the mirrored surfaces 725 and 726 are substantially determined by the width of the exposed surfaces of polysilicon surfaces 815 and 773, as viewed from above, in FIG. 8H.

Optical processors made according to the above process may be made to have mirrored surfaces 725 and 726 having any suitable width and length. One particularly useful embodiment for use with light having a wavelength of 1.5 micrometers has upper and lower mirror surface widths equal to 10 micrometers and mirror lengths equal to 200–300 micrometers in length. As one of ordinary skill would understand, the choice of mirror widths is dependent on numerous factors, including the wavelength of light with which the optical processor is to be used, acceptable PDL, concern for the creation of anomalous effects resulting from diffractive orders created along the top surface of the optical processor, and the desired angular separation of the sub-signals to be processed by the optical processor.

In embodiments where the sidewalls (not visible in FIG. 8I; corresponding to 371 and 373 in FIG. 3) are to be covered by a mirrored material, a metal deposition from an angle other than directly above the substrate can be used. As one of ordinary skill would understand, the angle of deposition can be selected to allow deposition on the sidewalls and to avoid deposition into the interstitial region (corresponding to 375 in FIG. 3).

This example fabrication sequence is not intended to limit the range of materials or fabrication technologies that can be employed to produce the optical grating and other actuation structures described above. For example, bulk micromachining, electro-machining, electro-deposition, electro-plating, rapid-prototyping, photochemical, and other manufacturing processes can be employed. Similarly, the materials used to form the components of the structures are not limited to those described above. It is to be recognized that while microelectronic materials can be particularly well-suited for many applications, given their electrical, mechanical, and lithographic characteristics, other material systems that enable control of residual stress can also be employed.

Figure 9:
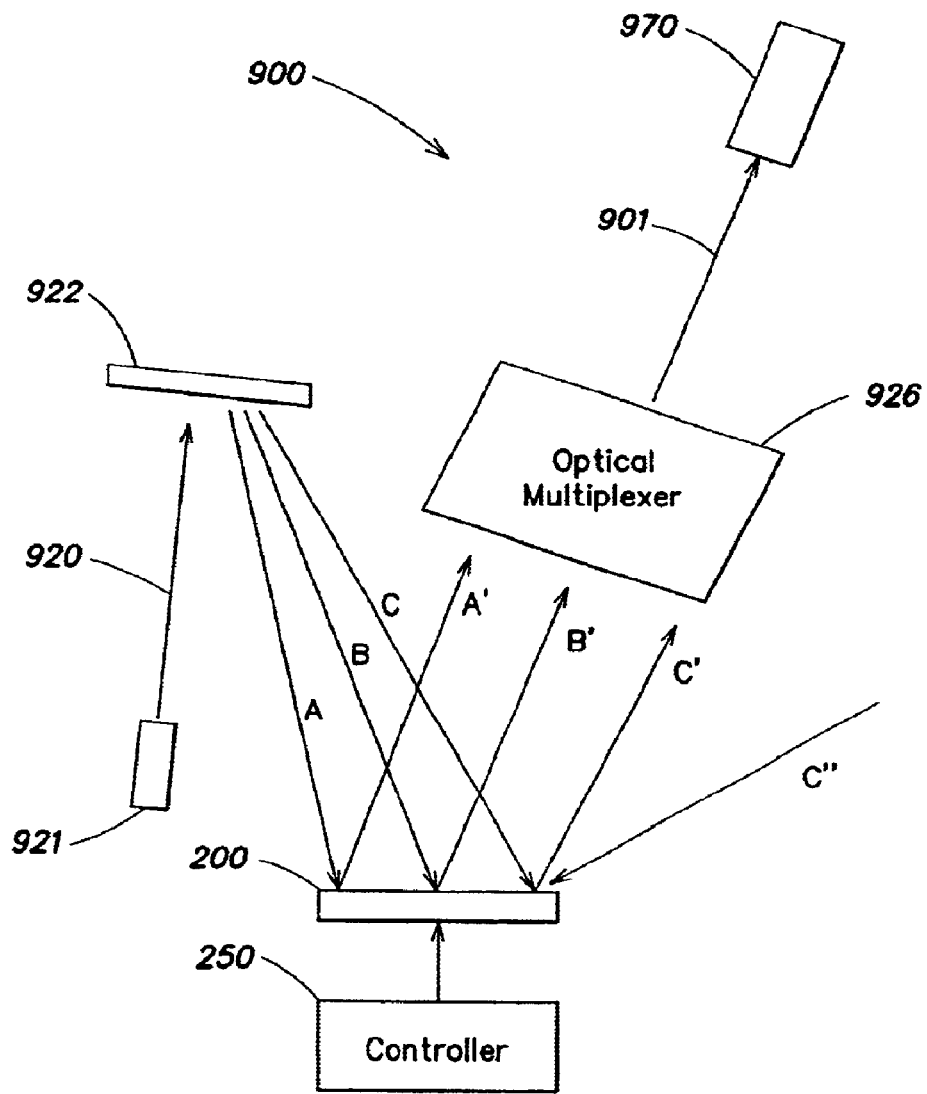
FIG. 9 is a schematic diagram illustrating one example of embodiment of a telecommunications system according to the present invention.

FIG. 9 is a schematic diagram illustrating one example of an embodiment of a telecommunications system 900 according to the present invention. In FIG. 9, an optical signal 920 from an optical fiber 921, the signal having a number of channels (i.e., a WDM signal), is directed to an optical demultiplexer 922. A fixed transmission diffraction grating or fixed reflection diffraction grating may be employed as the optical demultiplexer 922 (e.g., FIG. 9 illustrates a reflective element for the optical demultiplexer), although it should be appreciated that the invention is not limited in this respect; namely, other types of conventional or yet-to-be-developed optical elements may be used for the optical demultiplexer 922. The optical demultiplexer 922 may include one or more optical elements to spatially separate different wavelengths of the optical signal 920.

For purposes of the following discussion, the demultiplexer 922 shown in FIG. 9 is depicted as separating the optical signal 920 into three spatially distinct channels A, B, and C, each having a different nominal wavelength or band of wavelengths. In other embodiments, it should be understood that the separated constituents A, B, and C of the optical signal 920 shown in FIG. 9 alternatively may represent different wavelength bands or sub-bands of the optical signal. The word "sub-signal" shall be used herein to mean any of channels, bands, or sub-bands. Of course, it should also be appreciated that the depiction of three different channels (or wavelength bands) in FIG. 9 is for purposes of illustration only, and that the invention is not limited in this respect; namely, any number of channels sub-signals may be included in the optical signal 920 and spatially separated by the optical demultiplexer 922 at various resolutions.

In one embodiment of system 900, the purpose of the demultiplexer 922 is to achieve spatial separation of the tightly-spaced optical sub-signals within the wavelength-division multiplexed (WDM) optical signal 920. In other aspects, the demultiplexer 922 may provide spatial separation in which the sub-signals overlap to some extent; specifically, in some cases, two neighboring sub-signals may include one or more identical channels, along with other channels that are not included in both bands. The degree of spatial separation provided by the demultiplexer 922 relates to an overall resolution of system 900, which may be determined by various system design parameters. Hence, it should be appreciated the spatial separation provided by the demultiplexer 922 is a matter of design choice, and the invention is not limited to any particular implementation of the demultiplexer 922. Accordingly, in one aspect, system 900 may be specifically tailored to accommodate a variety of optical processing applications, based at least in part on the optical signals to be processed.

In FIG. 9, the three spatially separated channels A, B, and C are directed onto the surface of an optical processor 200. FIG. 9 also shows the corresponding zeroth-order diffraction (i.e., specular reflection) for each channel diffracted by optical processor 200 as A', B', and C'. The zeroth-order diffractions of the diffracted channels are directed in turn to an optical multiplexer 926 which recombines the diffracted channels into a single processed optical signal 901 (so that the processed signal can be directed into an optical fiber 970, for example). Optical multiplexer 926 may include one or more various conventional diffractive or refractive optical components for recombining the zeroth-order diffractions A', B', and C' of the diffracted channels.

For purposes of the following discussion, the path of the optical signal 920 through telecommunications system 900 in FIG. 9, including the separated constituents A, B, and C of optical signal 920, and the zeroth order diffractive outputs A', B', and C' from optical processor 200, is referred to as the "main pathway" through the apparatus. However, it should be understood that embodiments that include first or higher order diffractive outputs (i.e., orders other than the zeroth order) from optical processor 200 in the main pathway are within the scope of this invention.

FIG. 9 also shows that, according to one embodiment, telecommunications system 900 includes a controller 250 coupled to the optical processor 200. In this embodiment, the controller 250 is employed to control the diffracting processor 200 so as to individually and selectively diffract each of the channels A, B, and C impinging on the optical processor 200. In one aspect of this embodiment, the controller 250 and the optical processor 200 are capable of simultaneously controlling the diffraction of each of the channels A, B, and C, wherein each channel may be differently diffracted. As one of ordinary skill would understand, one or more passive elements such as a steering mirror (not shown) may be included as necessary, to fit telecommunications system 900 in a given apparatus housing (not shown).

System 900 described in FIG. 9 can be configured to operate as a variable optical attenuator (VOA) or a gain equalization filter (GEF) by actuation of the optical processor 200 by controller 250 so as to independently and variably control the main pathway intensity of the various channels. System 900 can also be configured to implement optical add/drop manipulation (OADM) optical processing functions. In OADM applications, the optical processor 200 is operated so as to substantially reduce the zeroth-order intensity of a particular channel of the optical signal 920 (i.e., a channel dropping function), or to optimally diffract a channel to be added from a separate optimally positioned input into the main pathway (i.e., a channel adding function).

In particular, to realize a channel adding function, an optical signal including the channel to be added may be optimally positioned with respect to the optical processor 200 so that the channel to be added strikes a portion of the grating such that a non-zeroth order C" (e.g., a first order) of the diffracted added channel is directed essentially along the main pathway (e.g., along with the zeroth-orders of diffracted channels A', B', and C' shown in FIG. 9). In this manner, the added channel can be spatially combined with the other channels by the optical multiplexer. From the foregoing, it may be appreciated that system 900 of FIG. 9 provides a versatile optical processing mechanism capable of a number of different functions in a single device.

Figure 10:
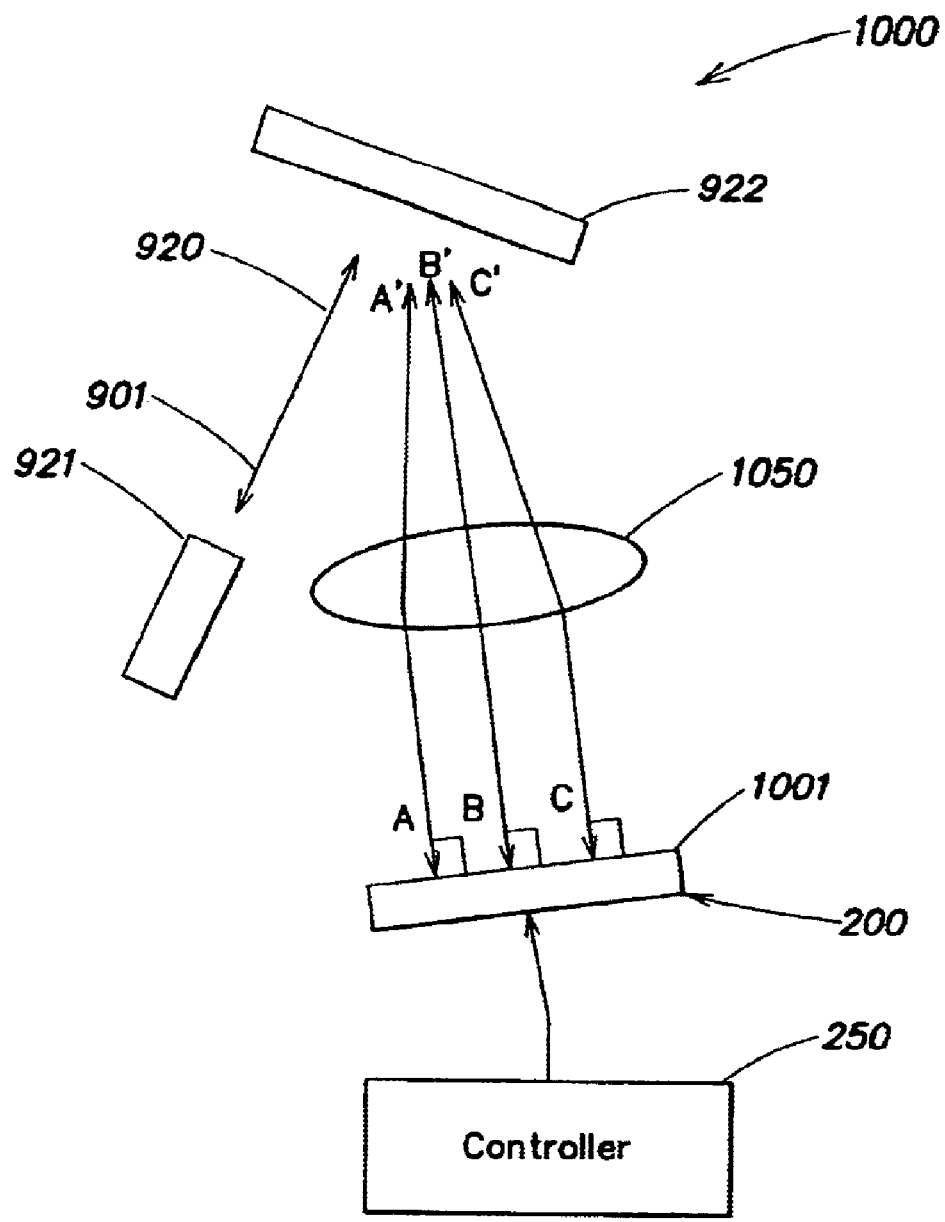
FIG. 10 is a schematic diagram illustrating an example of a second embodiment of a telecommunications system according to the present invention.

FIG. 10 is a schematic diagram illustrating an example of a second embodiment of a telecommunications system 1000 according to the invention. Similar to the system 900 illustrated in FIG. 9, system 1000 can be configured to operate as a VOA, GEF or an OADM. In FIG. 10, optical signal 920 from an optical fiber 921, the signal having a number of channels (i.e., a WDM signal), is directed to an optical demultiplexer 922. As described below, optical demultiplexer 922 operates as an optical multiplexer and demultiplexer in telecommunications system 1000. The optical demultiplexer 922 spatially separates channels (or subsignals) A, B, and C according to wavelength and directs the channels onto the surfaces of a diffracting optical element 200, through a lens system 1050 such that channels A, B, and C impinge on element 200 substantially normal to its top surface 1001.

Telecommunications system 1000 processes light similarly to telecommunications system 900 in FIG. 9, by controlling the strength of the zeroth-order (i.e., specular reflection) diffracted channels A', B', and C' for each of channels A, B, C respectively, using optical processor 200; however, in optical processor 1000 channels A, B, and C are projected onto optical processor 200 normal to the top surface 1001 of optical processor 200 such that channels A', B', and C' are diffracted by optical processor 200 back through lens system 1050 to demultiplexer 922 and are recombined (i.e., multiplexed). As one of ordinary skill in the art would understand, a circulator (not shown) may be included in the pathway of signal 920 and processed signal 921.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and presented by way of example only. The invention is limited only as required by the following claims and equivalents thereto.

What is claimed is:

1. An electrostatically-actuated diffractive optical processor having a substrate, and an axis normal to at least a portion of a surface of the substrate comprising:

a plurality of first mirror surfaces, each having two ends, at least a portion of each of the plurality of first mirror surfaces normal to the direction of the axis, and each suspended over the substrate and displaceable in the direction of the axis;

a plurality of supports each coupled to at least a corresponding one of the plurality of first mirror surfaces at a point intermediate the ends of the corresponding one of the plurality of first mirror surfaces;

a plurality of actuation beams, each of the plurality of actuation beams suspended over the substrate to form a corresponding actuation gap, each of the plurality of actuation beams coupled to at least one of the plurality of supports to suspend a corresponding one of the plurality of first mirror surfaces over the substrate, each of the plurality of actuation beams including an actuation region displaceable through the corresponding actuation gap;

a plurality of second mirror surfaces, at least a portion of each of the plurality of second mirror surfaces normal to the direction of the axis, each of the plurality of second mirror surfaces optically adjacent to at least a corresponding one of the plurality of first mirror surfaces for light projected parallel to the axis, each of the plurality of second mirror surfaces separated from the corresponding one of the plurality of first mirror surfaces by a corresponding distance in the direction of the axis; and a plurality of electrodes, each coupled to the substrate and corresponding to one of the plurality of actuation beams;

wherein when a voltage is applied between one of the plurality of actuation beams and the corresponding one of the plurality of electrodes, the actuation region is displaced through the corresponding actuation gap, the corresponding first mirror element is displaced, and the corresponding distance is changed.

2. The diffractive optical processor of claim 1, wherein each of the plurality of first mirror surfaces is coupled at the ends, and further wherein the optical processor is configured such that, when one of the plurality of first mirror surfaces is displaced in the direction of the axis such that the corresponding distance is changed, the one of the plurality of first mirror surfaces exhibits a curvature which is caused to be altered by a corresponding at least one of the plurality of supports.

3. The diffractive optical processor of claim 1, wherein the optical processor is configured such that, when one of the plurality of first mirror surfaces is displaced in the direction of the axis, the one of the plurality of first mirror surfaces is caused to be substantially planar in a region about its point intermediate the ends by a corresponding at least one of the plurality of supports.

4. The diffractive optical processor of claim 1, further comprising a plurality of mirror beams each having a top surface, each of the plurality of mirror beams suspending a corresponding one of the plurality of second mirror surfaces above the substrate and each forming a corresponding beam gap.

5. The diffractive optical processor of claim 4, wherein each of the plurality of second mirror surfaces covers the width of the top surface of a corresponding one of the plurality of mirror beams from edge to edge.

6. The diffractive optical processor of claim 4, wherein each of the plurality of mirror beams suspends a corresponding one of the second mirror surfaces a fixed distance above the substrate.

7. The diffractive optical processor of claim 4, wherein at least one of the plurality of actuation beams is coupled to two neighboring mirror beams of the plurality mirror beams, and wherein the at least one actuation beam is suspended above the substrate by the two neighboring mirror beams.

8. The diffractive optical processor of claim 1, wherein the widths of each of the plurality of first mirror surfaces is equal to the widths of each of the plurality of second mirror surfaces.

9. The diffractive optical processor of claim 1, wherein the widths of at least some of the plurality of second mirror surfaces is larger than the widths of each of the plurality of first mirror surfaces.

10. The diffractive optical processor of claim 1, further comprising a controller electrically coupled to the plurality of electrodes adapted to control the displacement of the plurality of first mirror surfaces.

11. The diffractive optical processor of claim 1, further comprising processing circuitry integrated on the substrate and electrically coupled to the plurality of electrodes so as to control the displacement of the plurality of first mirror surfaces.

12. The diffractive optical processor of claim 1, wherein the diffractive optical processor has a top surface, and wherein the optical processor is configured and arranged such that, when light is projected parallel to the axis, at least some of the light impinges on the diffractive optical processor substantially normal to the top surface.

13. The diffractive optical processor of claim 1, further comprising a frame coupled to the ends of each of the plurality of first mirror surfaces.

14. The diffractive optical processor of claim 4, wherein each of the plurality of mirror beams is actuatable.

15. The diffractive optical processor of claim 1, in a combination with a demultiplexer adapted to separate a wavelength division multiplexed signal into a plurality of sub-signals, wherein the diffractive optical processor is optically coupled to the demultiplexer to receive and diffract at least one of the plurality of sub-signals.

16. The combination of claim 15, wherein the diffractive optical processor has a top surface, and wherein at least one of the sub-signals impinges on the diffractive optical processor substantially normal to the top surface.

17. The combination of claim 15, wherein the demultiplexer is a diffractive demultiplexer.

18. The combination of claim 15, further comprising a controller electrically coupled to the plurality of electrodes, wherein the combination is configured to operate as a gain equalization filter.

19. The combination of claim 15, further comprising a controller electrically coupled to the plurality of electrodes, wherein the combination is configured to operate as a variable optical attenuator.

20. The combination of claim 15, further comprising a controller electrically coupled to the plurality of electrodes, wherein the combination is configured to operate to add a sub-signal to a main pathway.

21. The combination of claim 15, further comprising a controller electrically coupled to the diffractive optical processor, wherein the combination is configured to operate to drop one of the sub-signals from a main pathway.

22. A method of processing light, comprising:

providing an electrostatically-actuated diffractive optical processor having a substrate, and an axis normal to at least a portion of a surface of the substrate comprising (i.) a plurality of first mirror surfaces, each having two ends, at least a portion of each of the plurality first mirror surfaces normal to the direction of the axis, and each suspended over the substrate and displaceable in the direction of the axis, (ii) a plurality of supports each coupled to a corresponding one of the plurality of first mirror surfaces at a point intermediate the ends of the corresponding one of the plurality of first mirror surfaces, and (iii) a plurality of second mirror surfaces, at least a portion of each of the plurality of second mirror surfaces being normal to the direction of the axis, each of the second mirror surfaces optically adjacent to at least a corresponding one of the plurality first mirror surfaces for light projected parallel to the axis, each of the plurality of second mirror surfaces separated from the corresponding one of the plurality of first mirror surface a corresponding distance in the direction of the axis; and projecting light parallel to the axis onto the diffractive optical processor.

23. The method of claim 22, further comprising a step of supporting each of the plurality of first mirror surfaces at its ends.

24. The method of 22, further comprising a step of suspending each of the plurality of second mirror surfaces above the substrate such that each forms a corresponding beam gap.

25. The method of claim 22, wherein the diffractive optical processor has a top surface, and wherein the step of projecting light comprises projecting light onto the diffractive optical processor substantially normally to the top surface.

26. The method of claim 22, wherein the light comprises a wavelength division multiplexed signal, and the method further comprises a step of demultiplexing the light prior to projecting the light onto the diffractive optical processor to separate the wavelength division multiplexed signal into a plurality of sub-signals.

27. The method of claim 26, wherein the step of demultiplexing the light comprises diffractively demultiplexing the light.

28. The method of claim 27, further comprising a step of diffracting at least one of the sub-signals using the diffractive optical processor.

29. The method of claim 28, wherein the step of diffracting at least one of the sub-signals using the diffractive optical processor comprises substantially equalizing the sub-signals.

30. The method of claim 28, wherein the step of diffracting at least one of the sub-signals using the diffractive optical processor comprises dropping a sub-signal from a main pathway.

* * * * *

UNITED STATES PATENT AND TRADEMARK OFFICE
CERTIFICATE OF CORRECTION

PATENT NO. : 7,046,410 B2  Page 1 of 1
APPLICATION NO. : 09/975169
DATED : May 16, 2006
INVENTOR(S) : Erik R. Deutsch et al.

It is certified that error appears in the above-identified patent and that said Letters Patent is hereby corrected as shown below:

In column 2, line 25, delete "30"

Signed and Sealed this

Eighth Day of August, 2006

JON W. DUDAS
*Director of the United States Patent and Trademark Office*